US011081984B2

(12) United States Patent
Gabrys et al.

(10) Patent No.: US 11,081,984 B2
(45) Date of Patent: Aug. 3, 2021

(54) HIGH EFFICIENCY ELECTRONICALLY COMMUTATED MOTOR

(71) Applicants: Christopher W. Gabrys, Reno, NV (US); Timothy S. Rodgers, Bainbridge Island, WA (US)

(72) Inventors: Christopher W. Gabrys, Reno, NV (US); Timothy S. Rodgers, Bainbridge Island, WA (US)

(73) Assignee: Revolution Electric Motor Company, Reno, NV (US)

(*) Notice: Subject to any disclaimer, the term of this patent is extended or adjusted under 35 U.S.C. 154(b) by 0 days.

(21) Appl. No.: 16/408,315

(22) Filed: May 9, 2019

(65) Prior Publication Data

US 2020/0358380 A1 Nov. 12, 2020

(51) Int. Cl.
*H02P 27/06* (2006.01)
*H02P 6/182* (2016.01)
(Continued)

(52) U.S. Cl.
CPC .............. *H02P 6/182* (2013.01); *H02K 11/33* (2016.01); *H02K 21/14* (2013.01); *H02M 5/4585* (2013.01); *H02P 6/28* (2016.02)

(58) Field of Classification Search
CPC ........... H02P 6/182; H02P 6/28; H02K 11/33; H02K 21/14; H02M 5/4585
See application file for complete search history.

(56) References Cited

U.S. PATENT DOCUMENTS 5,825,597 A * 10/1998 Young ............... H02P 6/085
361/31
7,411,325 B1 * 8/2008 Gabrys ............... H02K 11/048
310/216.067
(Continued)

*Primary Examiner* — Muhammad S Islam
(74) *Attorney, Agent, or Firm* — J. Michael Neary

(57) ABSTRACT

An electronically commutated electric motor includes a rotor, a stator and an electronic drive. The rotor is journaled to rotate about an axis of rotation, the stator is stationary relative to the rotor, and the electronic drive provides synchronous power to the stator and drives the rotor. The rotor has two ferromagnetic radially spaced apart co-rotating rotor portions having a circumferential array of alternating polarity permanent magnet poles that drive magnetic flux back and forth across an armature air gap between said spaced apart rotor portions, and circumferentially through each of said rotor portions. The stator includes an air core armature supported in the armature airgap, and has a non-ferromagnetic structure where located in the magnetic flux in the armature air gap. Three phase windings wound on the armature magnetically exert torque upon the rotor when the windings are electrically energized by the electronic drive. The phase windings are wound from wire that is formed from bundled together multiple individually insulated conductor strands, wherein said strands are electrically connected in parallel and are electrically insulated between each other along their lengths where they lie in the magnetic flux in the armature airgap. The electronic drive is configured to convert electrical supply power into power that is synchronous with the rotor rotation by regulating power through a switch mode converter that varies voltage to a variable DC link supplying a transistor output H-bridge for commutating the phase windings. The electronic drive electrically energizes only two of the three phase windings simultaneously to provide trapezoidal excitation to the phase windings, leaving one of the three phase windings instantaneously electrically non-energized. The electronic drive monitors the (Continued)

instantaneous non-energized phase winding back-emf zero crossing events for controlling triggering of advances in the commutation.

20 Claims, 15 Drawing Sheets

(51) Int. Cl.
*H02K 11/33* (2016.01)
*H02M 5/458* (2006.01)
*H02P 6/28* (2016.01)
*H02K 21/14* (2006.01)

(56) References Cited

U.S. PATENT DOCUMENTS

2003/0076060 A1* 4/2003 Colosky ............... H02P 6/20
  318/400.32
2018/0262091 A1* 9/2018 Gieras ................ H02K 11/046

* cited by examiner

On-time is constant with a variable off-time = cycle also fluctuates

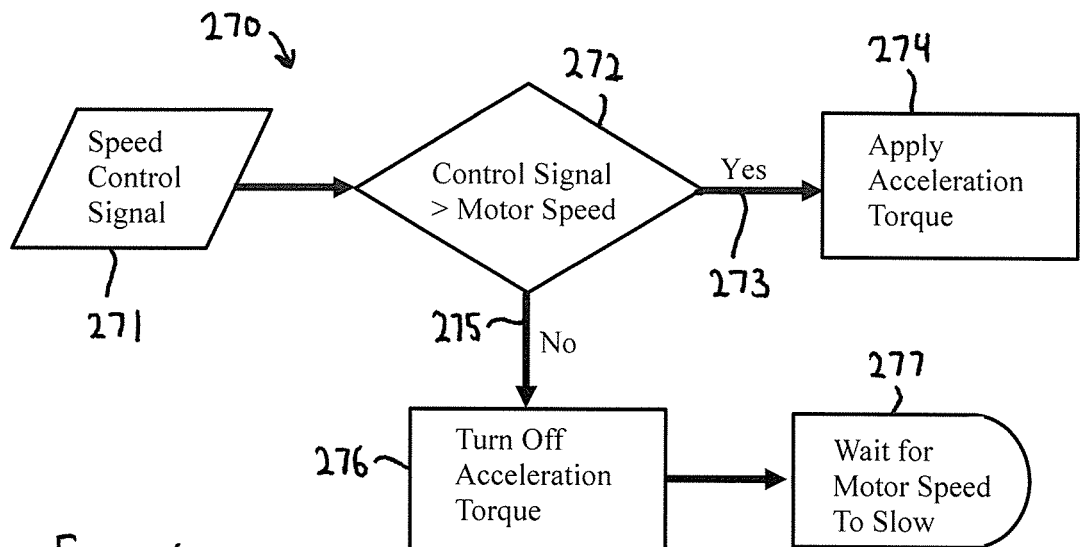
Fig. 16
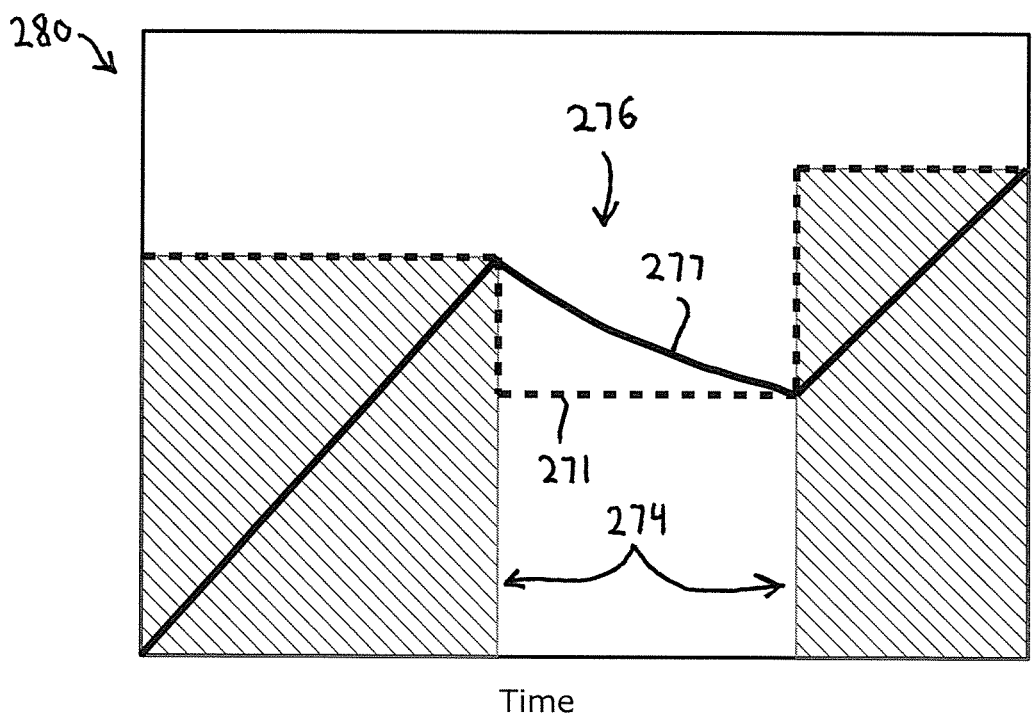
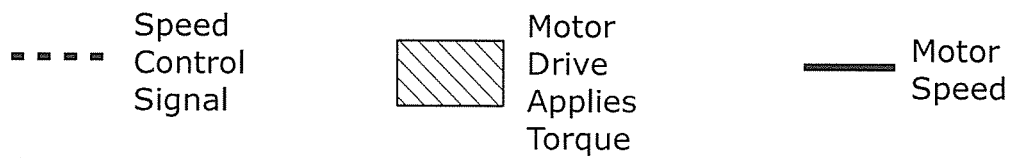
Fig. 16A

HIGH EFFICIENCY ELECTRONICALLY COMMUTATED MOTOR

This invention pertains to motors for converting between electrical and mechanical energy, and more particularly to a low cost brushless electronically commutated motor that provides increased efficiency in the converting of electrical supply power into rotary mechanical power.

BACKGROUND OF THE INVENTION

There has been a significant effort to increase the efficiency of electric motors for reducing customer operating costs. The most widely utilized type of motors for industrial applications is induction or asynchronous motors. Induction motors have limited efficiency, and have exceptionally poor efficiency in smaller sizes of 5 hp and less. Such motors are widely utilized in pumps and fans among other applications.

In a recent push to increase motor efficiency, a switch has started from use of induction motors to brushless permanent magnet motors, or electronically commutated motors. These motors utilize permanent magnets on the rotor to develop the field magnetic flux and operate with an electronic drive to produce and provide synchronous power to the motor windings.

Electronically commutated motors can provide improved efficiency (reduction of motor losses plus the included electronics loss) compared with induction motors, especially in sub fractional horsepower sizes. Unfortunately, electronically commutated motors still suffer higher losses and operating costs than desirable. As some increased level of motor size is reached, the electronically commutated motor also can no longer currently provide a significant efficiency improvement over the induction motor. This presently limits the practical size for efficiency-marketed electronically commutated motors.

In high duty cycle applications, electric motors consume electricity costing about five times their initial purchase price every year. Increasing the efficiency of electronically commutated motors is desired to provide a significant reduction in customer operating costs. It is also desired to provide energy cost savings for all sizes of motors. A new electronically commutated motor is needed with substantially higher efficiency, and with higher efficiency regardless of motor size. Such new motors would also preferably have lower weight and reduced size.

SUMMARY OF THE INVENTION

The future of electric motors is believed to lie in new very high efficiency variable speed motors and ones that are also lighter and/or smaller size. The invention provides a new motor with significantly higher efficiency along with reduced weight. The electronically commutated motor combines a special air core construction with unique cooperating electronic drive configuration that operates reliably and maximizes efficiency. Air core permanent magnet motors can achieve higher efficiency than conventional slotwound motors if specially designed. However, surface mounted magnet air core motors typically have very low winding inductance and inductance that does not vary with rotor rotational position. As a result, common sensorless variable speed drives used to drive such motors with synchronous power require complex high speed calculations and can tend to lose commutation synchronization at operating speed as well as full efficiency potential. Conventional flux vector sine wave drives power all three phase windings of a motor simultaneously, making sensorless position determination and commutation accuracy difficult.

The invention overcomes these difficulties to provide maximum efficiency with reliable operation. The invention provides an electronically commutated motor for converting between electrical and rotary mechanical energy. The motor includes a rotor, a stator and an electronic drive. The rotor is journalled to rotate about an axis of rotation, the stator is stationary relative to the rotor, and the electronic drive provides synchronous power to the stator and drives the rotor. The rotor is constructed of two ferromagnetic spaced apart co-rotating rotor portions having a circumferential array of alternating polarity permanent magnet poles that drive magnetic flux back and forth across an armature air gap created between the spaced apart rotor portions, and circumferentially through each of the rotor portions. The stator includes an air core armature supported in the armature airgap. The air core armature has a non-ferromagnetic structure where it is located in the magnetic flux in the armature air gap, and has three phase windings that magnetically exert torque upon the rotor when the windings are electrically energized by the electronic drive. The phase windings are wound from wire that is formed from bundled together multiple individually insulated conductor strands. The strands are electrically connected in parallel and are electrically insulated between each other along their lengths where they lie in the magnetic flux in the armature airgap. The electronic drive is configured to convert electrical supply power into power that is synchronous with the rotor rotation by regulating power through a switch mode converter that varies voltage to a variable DC link that supplies a transistor output H-bridge for commutating the phase windings. The electronic drive further electrically energizes only two of the three phase windings simultaneously to provide trapezoidal excitation (also known as six-step) to the phase windings. The electronic drive leaves one of the three phase windings instantaneously electrically non-energized. The electronic drive further monitors the instantaneous non-energized phase winding back-emf zero crossing events for controlling triggering of advances in the commutation.

The air core armature and topology in the motor precludes development of significant magnetic induced losses and provides high efficiency across wide operating conditions. Magnetic losses are reduced by lack of pole teeth from winding slots as well as by elimination of passing a circumferentially varying magnetic flux through a stationary steel stator that would otherwise cause eddy current and hysterisis losses. In the electronically commutated motor, instead the whole magnetic flux path rotates as co-rotating rotor portions. Additionally, the winding wire construction limits the conduction cross-sectional dimension where inside the magnetic flux in the airgap, preventing generation of significant eddy currents in the actual windings. The air core armature has a very low inductance which ordinarily could make current regulation of the windings very difficult with electronic commutation, especially at higher fundamental frequencies. We have found that electronic commutation of the low inductance air core construction can cause high ripple currents unless series winding inductors are added between the phase windings and commutation bridge. Such inductors add cost, losses and weight. The invention overcomes the need for added inductors between the electronic drive and motor windings as well as difficult current regulation by utilizing a variable DC link topology. The electronic drive provides a variable DC voltage, varied by a switch mode converter, to the bus input of the commutation H-bridge. By this method, the functions of the electronic drive may be compartmentalized, bolstering control simplicity and reliability. In conjunction, instantaneously energizing only two of the three phase windings allows direct accurate measurement of the rotational position for accurate commutation, despite the constant low inductance air core armature and even with high fundamental frequency from the motor design.

Conventional switch mode converters typically use pulse width modulation switching such as a PWM buck converter topology. This method switches at a fixed frequency and varies the pulse width to vary power. Switching, though, occurs at full voltage which leads to high switching losses for the power regulation, which would preferably be avoided. In an additional embodiment, the switch mode converter comprises a resonant converter. Resonant switch mode conversion is more efficient that PWM switching because the resonance causes the voltage and current to naturally pass through zero passively. The transistors can thereby be switched instantaneously when at zero voltage and/or zero current, minimizing switching losses for higher efficiency voltage variation to the variable DC link.

Most electronic drives utilize switching of the transistors in the commutation H-bridge for both providing commutation at the fundamental frequency and for high frequency chopping to regulate the power such as for torque (current) or speed control of the motor. Such regulation requires a minimum amount of inductance in the coupled phase windings to prevent substantial current ripple and harmonics that lead to added losses. The construction of the motor in accordance with the invention has low inductance which exacerbates these issues. In yet a further embodiment, the output H-bridge provides only commutation switching. The level of current supplied to the phase windings is regulated by the switch mode converter prior to the commutation H-bridge. By regulating the voltage to the DC link feeding the commutation H-bridge, the switch mode converter provides the regulation of the torque (current) and speed of the motor, while the H-bridge need only provide lower frequency commutation switching of the phase windings each either fully on or fully off at the much lower fundamental frequency. This makes commutation control and switching more accurate, switches a fewer number of transistors for regulation for lower losses (no high frequency switching and resultant losses of the six H-bridge transistors) and allows implementation of zero voltage and/or current switching that would otherwise not be possible by regulation switching in the H-bridge, as opposed to supplying a variable DC link. The required inductance to prevent high current ripple no longer needs to be integral in the phase windings, which have low inductance in the electronically commutated motor, but instead is easily provided in the switch mode converter varying the DC link that supplies the commutation H-bridge.

Benefits of the invention include not only high efficiency, but also the ability to provide significant weight and/or size reduction compared to conventional motors. We have found that the weight of the two ferromagnetic rotor portions, or backirons, may be dramatically reduced by increasing the motor rotor pole count. This weight reduction comes from allowing use of thinner steel rotor portions for conduction of magnetic flux circumferentially between adjacent magnetic poles. The higher the number of rotor poles, the smaller the arc length of the individual permanent magnet poles and hence less total flux to conduct circumferentially between poles. Less magnetic flux allows the steel rotor portions to be made thinner without saturation. We have also found that there exists an ideal range of numbers of poles for a rotor along with the number of turns of the phase windings that mininimizes rotor weight without substantially increasing eddy current losses in the windings from increased fundamental frequency of the rotor rotation varying the magnetic flux through the air core armature. In yet an additional embodiment, the rotor comprises a number of poles, NP, such that $14 \leq NP \leq 28$, the phase windings each comprise a number of turns, NT, such that $7 \leq NT \leq 14$, and the phase windings are connected in a wye configuration with a phase leg to neutral inductance of less than 200 µH results in a further reduction in the phase winding inductances. With a conventional electronic drive, such low inductances would be even more problematic. However with the electronic drive of the electronically commutated motor in accordance with the invention, this is not an issue. Accordingly, the weight and/or size of the electronically commutated motor can be substantially reduced for lower manufacturing, shipping and installation costs.

Air core armatures can be constructed of various configurations, all having a substantially non-ferromagnetic structure where located in the magnetic flux in the armature airgap. The non-ferromagnetic structure prevents generation of hysterisis and eddy current losses that would otherwise occur in ferromagnetic material. In a further embodiment, the phase windings comprise active lengths where inside the magnetic flux in the armature airgap that generate torque when energized, and the active lengths of all three phase windings lie in a single layer. Construction of the air core armature with all of the phase windings to lie in a single layer provides multiple benefits. It provides for maximum windings density in the armature air gap to minimize the windings resistance for high efficiency, and it minimizes the required armature airgap for maximum magnetic flux density per amount of magnet material and cost. Such winding construction requires that the pole pitch of the rotor be split by all of the phases which results in a trapezoidal back emf as opposed to a sinusoidal back emf which is generated when a single phase winding has a width equal to the pole pitch. Maximum efficiency and power density of an electronically commutated motor is achieved when the back emf matches the shape of the electronic drive output. In this case, both the back emf of the air core armature and the electronic drive are trapezoidal. In practice, the leakage of rotor magnetic flux between adjacent poles cause some rounding of the waveform making the back emf not perfectly trapezoidal but somewhat pseudo-trapezoidal, or trapezoidal but having some sinusoidal component.

Besides higher efficiency and reduction in weight, the electronically commutated motor can also be constructed to yield reduced manufacturing costs. One portion of the manufacturing costs lies in the manufacture of the air core armature. In conventional slotwound type motors, multiple individual coils of a phase are inserted separately into stator slots and coupled together by many electrical connections. The electronically commutated motor in accordance with the invention may be wound with a single winding per each phase and only-six ends for a three phase motor. In an additional embodiment, the phase windings are wound such that multiple turns of a single phase comprise multiple passes around the circumference of the air core armature. All of the turns of a phase are consecutively wound as multiple passes around the circumference. This dramatically reduces and in fact minimizes the number of electrical connections to only four, which comprise connection of center neutral and the three phase lead connections. This saves manufacturing complexity and costs. In addition, the construction can minimize end turn thickness and distance thereby reducing armature windings resistance for increased efficiency.

In an additional embodiment, the phase windings are connected in a wye configuration and each has a phase leg to neutral inductance in Henries, L, the switch mode converter limits current supplied to the phase windings by switching at a frequency in Hz, f, wherein f≥(4/L). Having minimized impedance provides increased efficiency while the switching frequency is maintained high enough to sufficiently limit current ripple and harmonics.

In other embodiments, the electronically commutated motor comprises a rotor, a stator and an electronic drive. The rotor is journaled to rotate about an axis of rotation, the stator is stationary relative to the rotor, and the electronic drive provides synchronous power to the stator and drives the rotor. The rotor is constructed of a ferromagnetic cylindrical rotor portion having a circumferential array of alternating polarity permanent magnet poles that drive magnetic flux back and forth across an armature air gap created adjacent the rotor portion and circumferentially through the rotor portion. The stator comprises an air core armature supported in the armature airgap. The air core armature has a non-ferromagnetic structure where located in the magnetic flux in the armature air gap with phase windings that magnetically exert torque upon the rotor when the windings are energized by the electronic drive. The phase windings are wound from wire that is formed from bundled together multiple individually insulated conductor strands, wherein the strands are electrically connected in parallel and are electrically insulated between each other along their lengths where they lie in the magnetic flux in the armature airgap. The electronic drive converts electrical supply power into power that is synchronous with the rotor rotation, and the electronic drive energizes only two of three phase windings simultaneously to provide trapezoidal excitation to the phase windings. The electronic drive leaves a third phase winding instantaneously non-energized while the two phase windings are energized, wherein the electronic drive further monitors the instantaneous non-energized phase winding back-emf zero crossing events for controlling triggering of advances in the commutation. With the cylindrical ferromagnetic rotor portion comprising a tube, the circumferential array of alternating permanent magnet poles can comprise radially magnetized arc magnets. Such magnets may be located at the inner diameter of the ferromagnetic tube and thereby be radially contained against rotational forces. Likewise, the air core armature may be readily axially inserted into the radial armature airgap of an assembled rotor for easy motor assembly.

In yet a further embodiment, the electronic drive regulates power through a switch mode converter that varies voltage to a variable DC link supplying a transistor output H-bridge for commutating the phase windings. Additionally, the switch mode converter regulates power using frequency modulation. Frequency modulation utilizes a constant pulse on-time but varies off-time, which results in variation of the switching frequency. One of the advantages of frequency modulation over common pulse width modulation is reduced switching losses when operating under light loads. With pulse width modulation, the switching frequency and resulting switching losses are constant, independent of load. In contrast, with frequency modulation, the switching frequency and resulting switching losses are reduced at light loads. This allows the electronically commutated motor in accordance with the invention to maintain high efficiency over a broad range of speed and load, with particularly higher efficiency when operating at reduced power. Further bolstering the efficiency, the frequency modulation to the variable DC link minimizes switching loss through the use of soft switching. In hard switching, transistor switching occurs with voltage and currents at high levels, but soft switching employs transistor switching at near zero voltage or near zero current greatly reducing switching losses for higher efficiency.

The losses in the air core armature arise from resistive losses from the winding resistance and phase current through the windings, as well as eddy current losses in the wire strands as the armature air gap magnetic flux passes transversely through the strands at the fundamental frequency from the rotating rotor. We have found that there is a range of the insulated copper strand diameter that provides maximum benefit. In an additional embodiment, the individually insulated strands comprise copper wires with a diameter in inches, d, such that 0.005≤d≤0.010. With strand diameters greater than 0.010 inches, the eddy current losses begin to increase rapidly, as the losses are proportional to the square of the strand diameter. Likewise, strand diameters less than 0.005 inches do not significantly lower the eddy current losses while increasing costs and making solder connections of the ends of the phase windings more sensitive.

DESCRIPTION OF THE DRAWINGS

The invention and its many advantages and features will become better understood upon reading the following detailed description of the preferred embodiments in conjunction with the following drawings, wherein:

FIG. 16 is a block diagram of a speed control algorithm for use in an electronically commutated motor in accordance with the invention.

FIG. 16A is an operation chart illustrating the functioning of the speed control algorithm of FIG. 16.

DESCRIPTION OF THE PREFERRED EMBODIMENT

Figure 1:
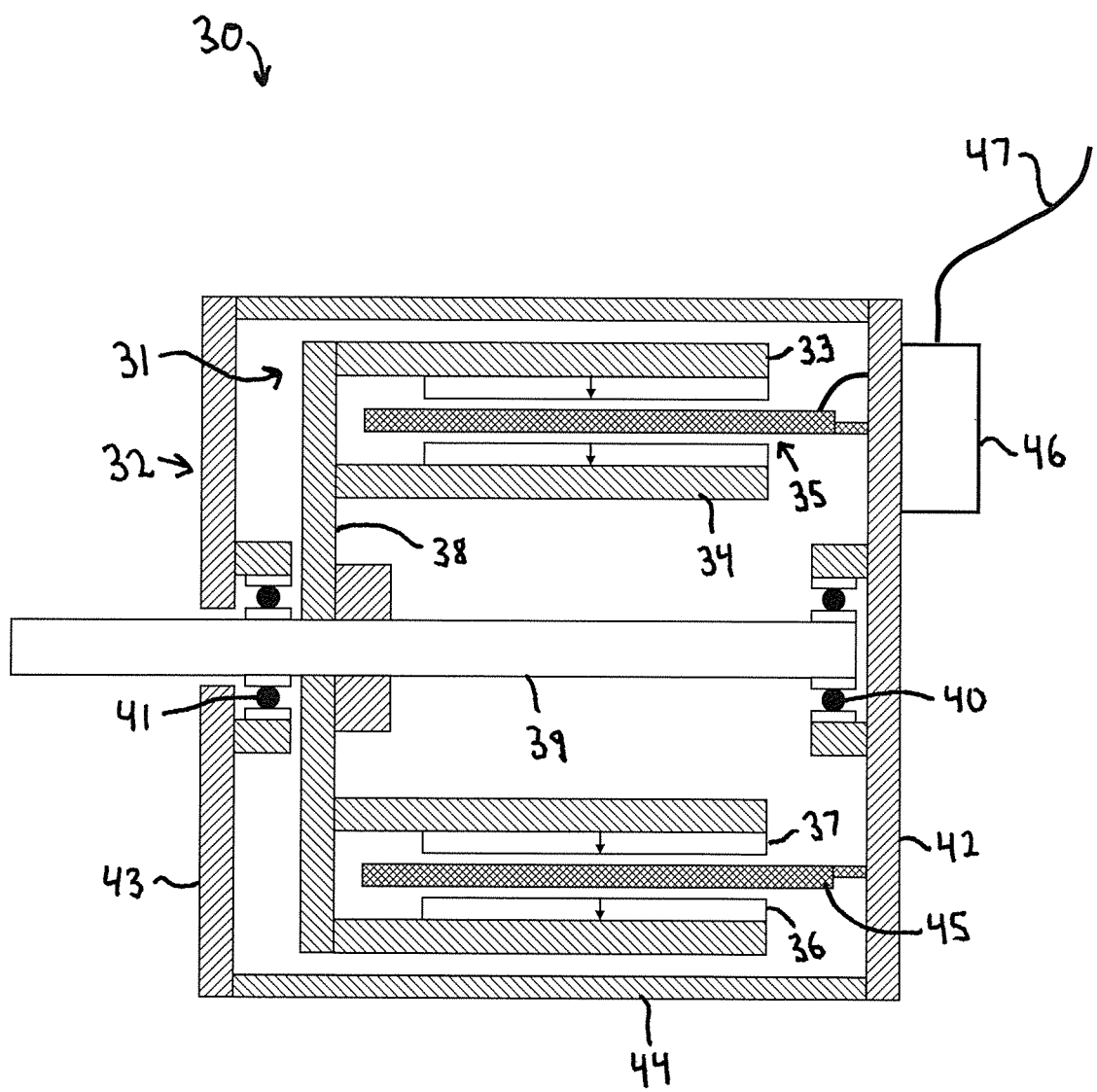
FIG. 1 is a schematic drawing of a radial gap configuration electronically commutated motor in accordance with the invention.

Turning to the drawings, wherein like reference characters designate identical or corresponding parts, FIG. 1 shows a schematic drawing of a radial gap configuration electronically commutated motor in accordance with the invention. The motor 30 is comprised of a rotor 31, a stator 32 and an electronic drive 46. The rotor is constructed of two spaced apart co-rotating cylinders 33, 34 made of a ferromagnetic material such as steel, with circumferential arrays of alternating polarity permanent magnets 36, 37 that drive magnetic flux back and forth across an armature airgap 35 between the cylinders 33, 34. Although shown with magnets on both cylinders 33, 34, a circumferential array of magnets may alternatively be applied to only one cylinder, such as the inner diameter of the outer cylinder 33, for manufacturing ease and reduction of centrifugal bond stresses but with lower resulting magnetic flux in the armature airgap 35 per amount of magnet material. The steel cylinders 33, 34 are attached to a hub 38 which couples to a shaft 39. The shaft 39 is journaled for rotation by bearings 40, 41. The bearings 40, 41 are supported by housing endplates 42, 43 which are connected by an outer housing tube 44. Located inside the armature airgap 35 is an air core armature 45 which is supported by housing endplate 42. The air core armature 54 exerts torque onto the rotor 31 when its windings 60 (FIG. 2) are energized. The electronic drive 46 is also attached to the housing endplate 42. The electronic drive 46 converts electrical power supplied through a utility or fixed frequency power connection 47 into synchronous power provided to the air core armature 45 that drives the rotor 31.

Figure 1A:
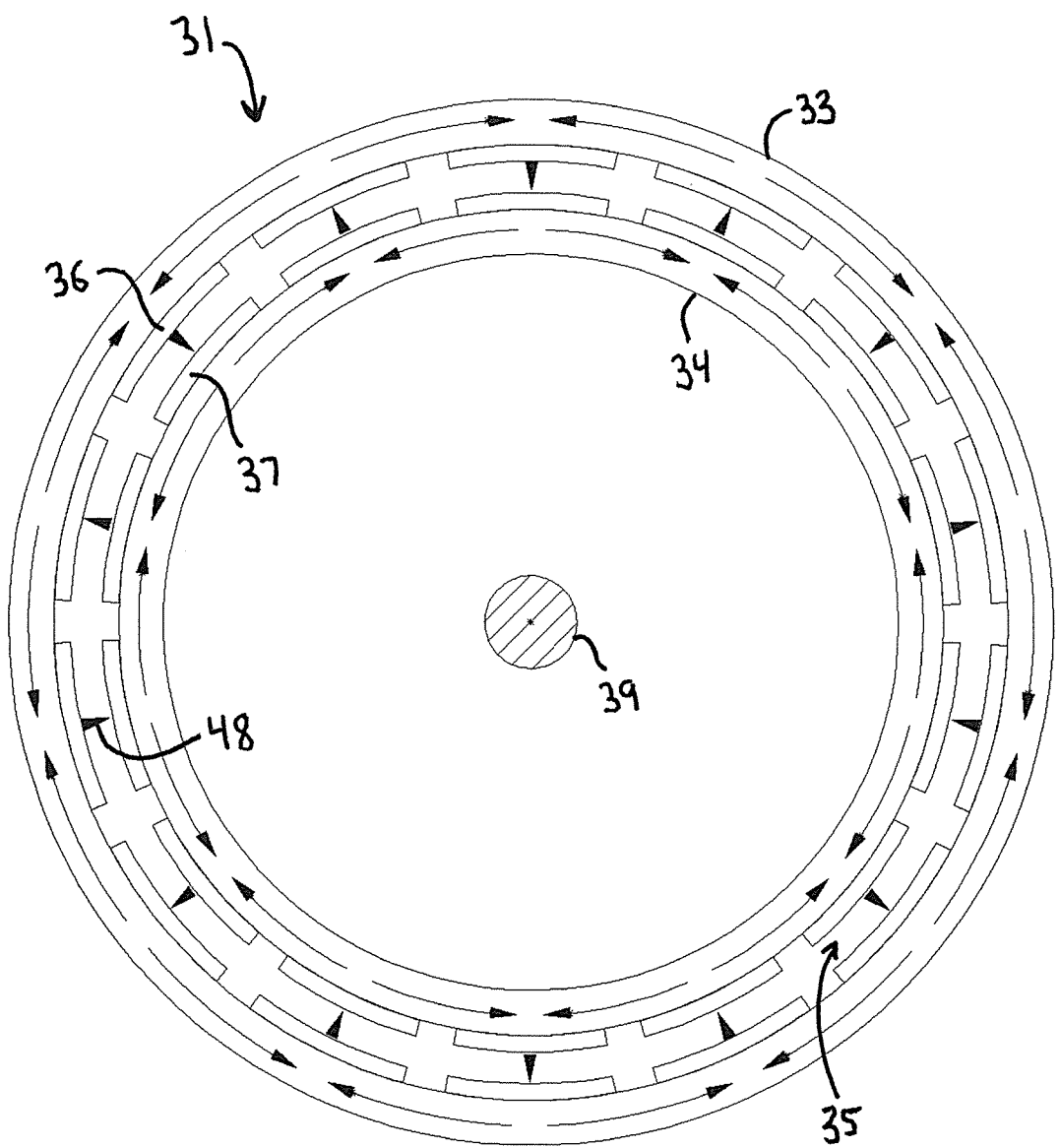
FIG. 1A is a schematic end view drawing of the rotor in the electronically commutated motor of FIG. 1.

A schematic end view drawing of the rotor in the electronically commutated motor of FIG. 1 is shown in FIG. 1A. The rotor 31 has two radially spaced apart co-rotating inner and outer cylindrical steel rotor portions 34, 33. Circumferential arrays of alternating polarity permanent magnets 36, 37 are attached to the steel cylinders 33, 34. The magnet arrays 36, 37 drive magnetic flux 48 back and forth radially across the armature airgap 35 and circumferentially through the ferromagnetic cylinders 33, 34.

Figure 2:
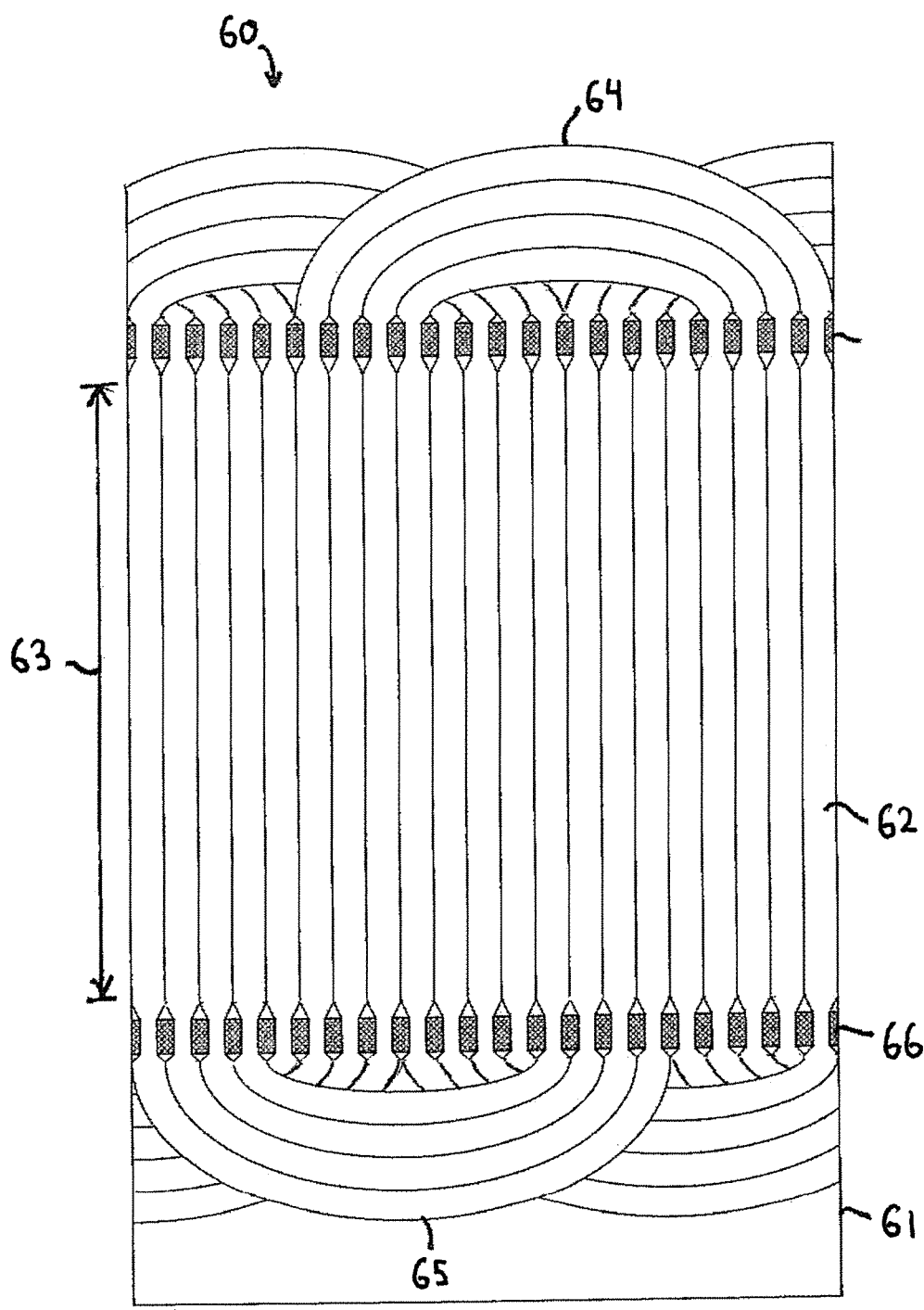
FIG. 2 is a schematic drawing of an air core armature winding for use in an electronically commutated motor in accordance with the invention.

A schematic drawing of an air core armature winding for use in an electronically commutated motor in accordance with the invention is shown in FIG. 2. The winding 60 is part of the air core armature 45 and comprises winding wires 62 supported by a support form 61 made of a substantially non-ferromagnetic material such as fiberglass composite or polycarbonate that holds the wires in the correct pattern for multiple phase torque generation and in the armature airgap 35 without contacting the rotor 31. Although air core armatures can be wound in several patterns including multiple individual coils per phase of helical angled patterns, the windings 60 shown utilize active lengths 63 that traverse axially where they lie in the magnetic flux in the armature airgap, and circumferentially as end turns 64, 65 outside of the magnetic flux. Wire clamps 66 can be used to aid the winding process by holding the wires 62, although not required. As shown, the windings 60 are wound such that active lengths 63 of multiple phases all lie in a single layer, which minimizes the required magnetic airgap for increased magnetic flux density per amount of magnet material. Likewise the windings 60 are wound in a serpentine pattern, such that multiple turns of a single phase comprises multiple passes around the circumference of the air core armature. The windings 60 thereby eliminate the need for a high number of electrical connections if wound as multiple individual coils per phase, as well as higher end turn thicknesses. Ideally the windings 60 comprise three phases with a single wye neutral connection and with three phase leg connects for a total of only four connections.

Figure 3:
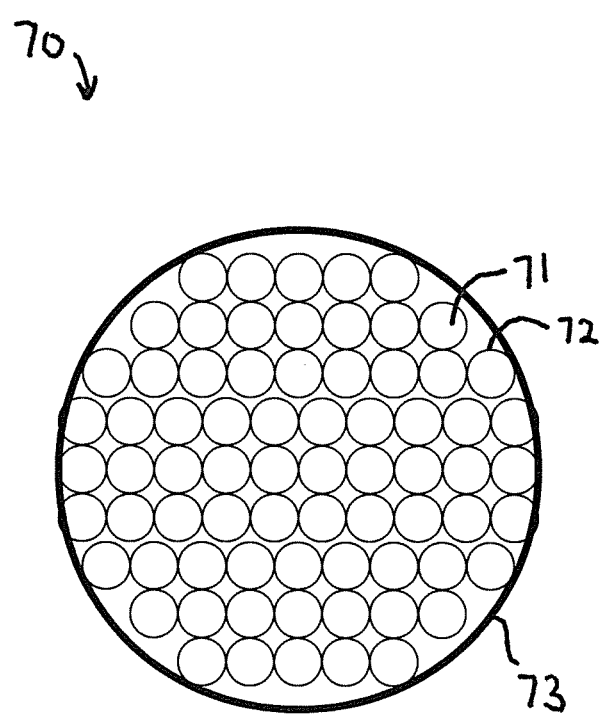
FIG. 3 is a cross-sectional drawing of phase winding wire for use in an electronically commutated motor in accordance with the invention.

A cross-sectional drawing of phase winding wire for use in an electronically commutated motor in accordance with the invention is shown in FIG. 3. High efficiency of the motor is achieved by precluding eddy currents in the actual winding wire as the circumferentially varying magnetic flux for the rotor penetrates the wires on the stationary air core armature of the stator. The wire 70 is formed from bundled together multiple individual strands 71 with enamel insulation 72 such that they are insulated from each other where in the active region of the windings, or inside the magnetic flux in the armature airgap. The strands are electrically connected in parallel by soldering the strands 71 together at the ends of each phase winding where located outside the magnetic flux. The strands 71 of the wire are preferably twisted or transposed such that each strand occupies similar lengths at different locations within the wire 70. This prevents circulating currents in the different strands from generating different instantaneous back emf while electrically connected together in parallel by the solder connections at the ends of the phase windings. To aid in handling, winding and dielectric breakdown strength, an outer serve insulation wrap 73 of tape, textile or extrusion may also be included around the bundle of strands 71.

Figure 4:
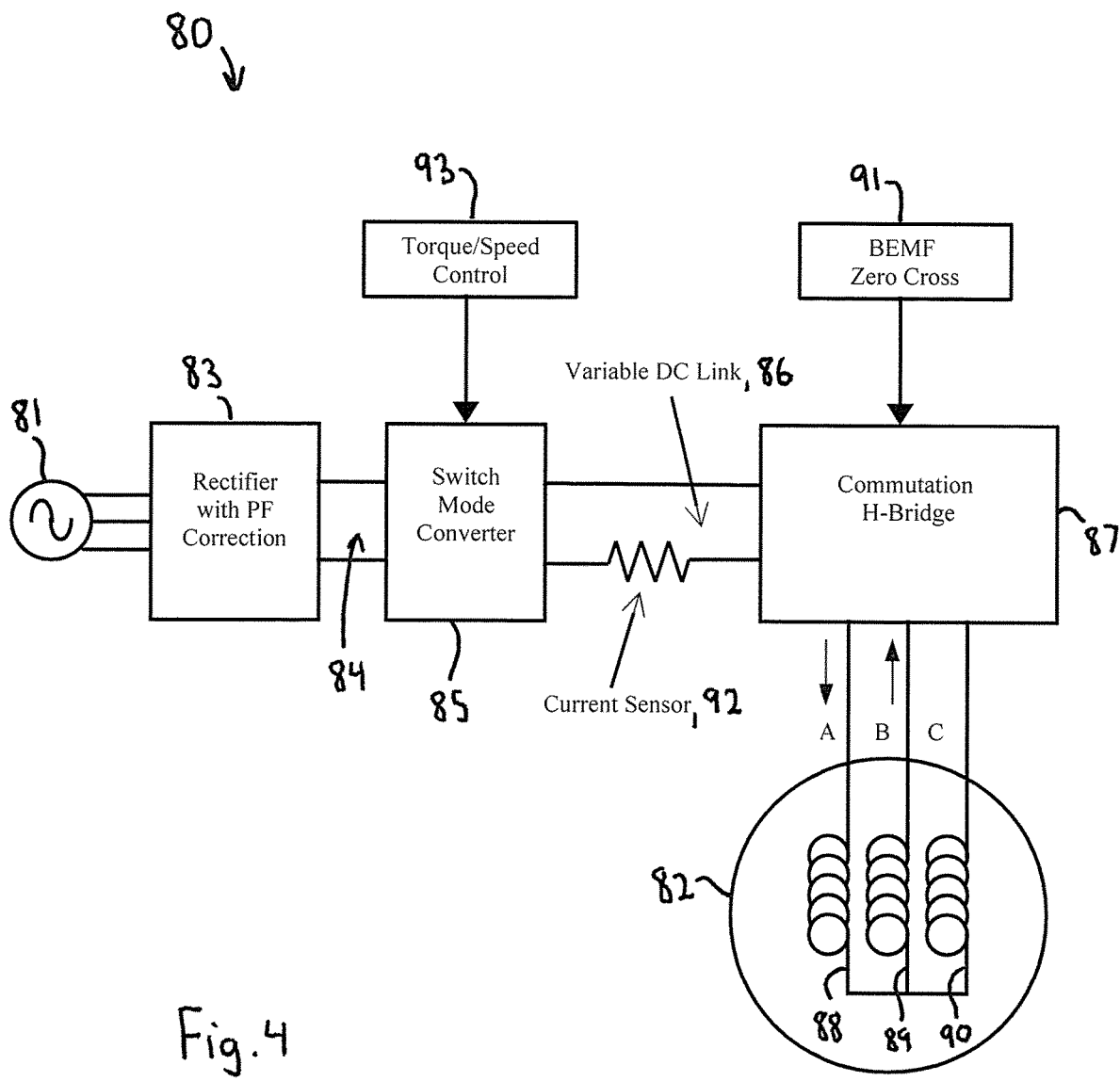
FIG. 4 is a block component and operational diagram of an electronic drive for use in an electronically commutated motor in accordance with the invention.

A block component and operational diagram of an electronic drive for use in an electronically commutated motor in accordance with the invention is shown in FIG. 4. The electronic drive 80 includes a fixed frequency power source, typically single or three phase utility power 81. The utility power 81 is rectified to fixed voltage DC power 84 by an input rectifier 83. The input rectifier 83 includes power factor correction that improves the power factor reflected to the utility power connection 81, bringing it close to unity.

Power factor correction can either be passive or active, while active correction circuits tend to be smaller and more effective. The fixed voltage DC power 84 feeds into a switchmode converter 85 that outputs to a variable voltage DC link 86. The voltage level of the variable DC link 86 is used to regulate both the torque and the speed of the rotor. A shunt resistor 92 in the variable DC link 86 is used to monitor the drive current, directly related to the torque, that will drive the armature phase windings 88, 89, 90 of the air core armature 82. The variable DC link 86 powers the commutation H-bridge 87 which instantaneously turns on two of the three phase windings at any time to generate torque to the rotor. The commutation H-bridge 87 provides six step commutation and a trapezoidal excitation of the phase windings 88, 89, 90. With two phase windings instantaneously energized 88, 89, the third winding 90 is not energized. The back emf of the instantaneous non-energized winding 90 is monitored for when it crosses zero voltage. The BEMF, back emf, zero cross signal 91 is used to control triggering of advances in commutation of the H-bridge 87. After sensing a zero crossing, a 30 electrical degree delay is implemented before advancing the commutation switching of the H-bridge 87. After a commutation advance, a different pair of two phase windings is instantaneously energized and a different phase winding becomes the non-energized winding used to monitor back emf zero crossing to control the timing of the subsequent commutation advance. The electronic drive 80 can be operated in torque control mode whereby the current sensor alone provides torque feedback 93 to the switchmode converter 85 that adjusts the voltage of the variable DC link 86 accordingly. Likewise, the electronic drive 80 may also be operated in speed control mode, whereby the frequency of the commutation of the H-bridge provides speed feedback 93 to the switchmode converter 85 that adjusts the voltage of the variable DC link 86 accordingly. In speed control mode, the current sensor 92 is also used to provide torque or current feed back 93 to prevent excessive acceleration and over-currents in the electronic drive 80 that may cause damage.

Figure 5:
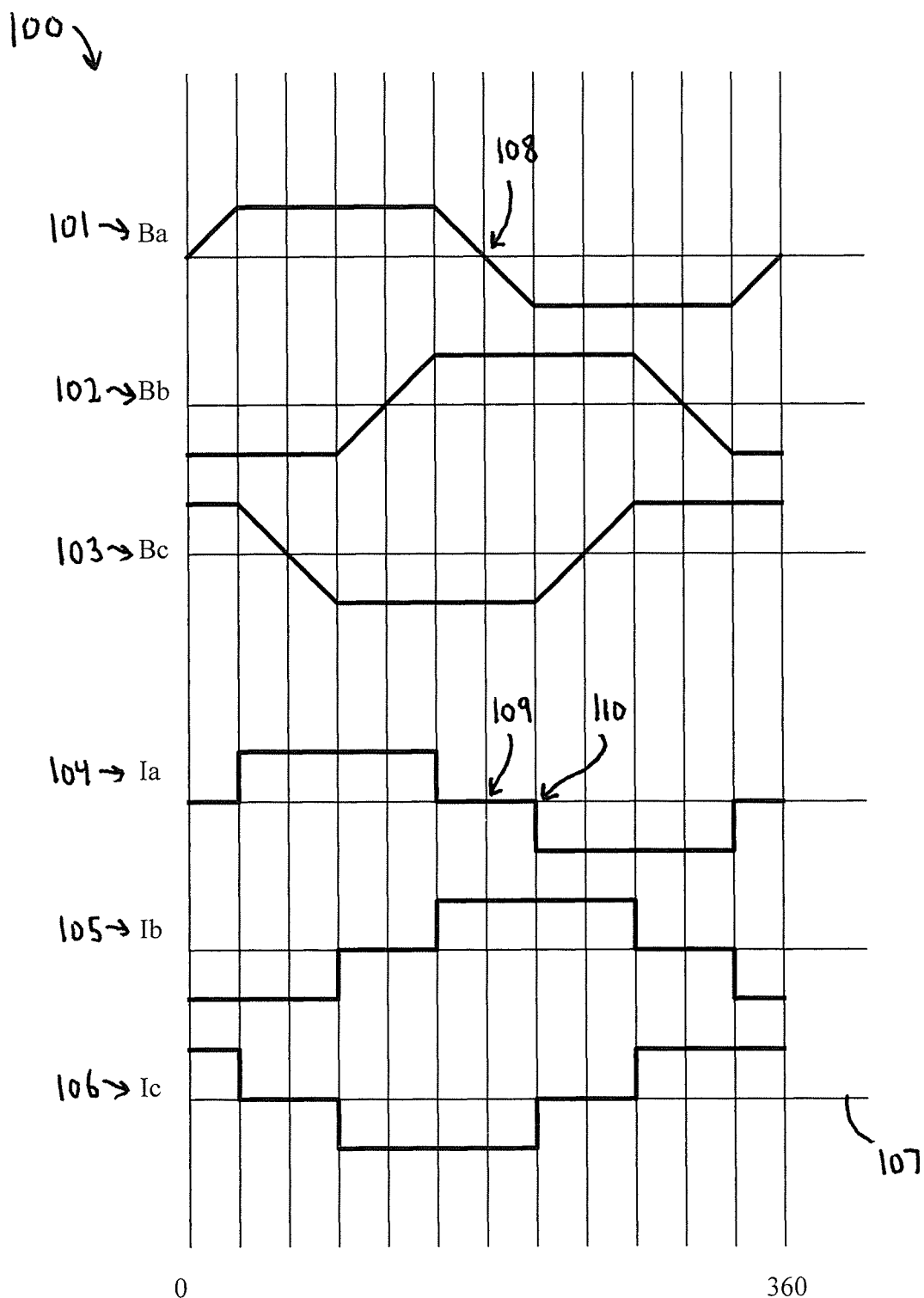
FIG. 5 is a plot of the phase back emf and corresponding commutation currents for an electronically commutated motor in accordance with the invention.

A plot of the phase back emf and corresponding commutation currents for an electronically commutated motor in accordance with the invention is shown in FIG. 5. As the rotor of the electronically commutated motor rotates, the magnetic flux penetrating the air core armature in the armature airgap generates back emf waveform 101, 102, 103 in the phase windings. As shown in the plots 100, the back emf wave forms 101, 102, 103 per the electrical degree axis 107 are preferably trapezoidal to preferably match the six step commutation as close as possible for the highest total electronically commutated motor efficiency. The back emf waveform 101, 102, 103 could also be sinusoidal but with lower total efficiency. Pseudo-trapezoidal, or trapezoidal with slightly rounded edges, is most typical due to the windings configuration and leakage flux between adjacent magnetic poles on the rotor portions that fails to cross the armature airgap and penetrate all of the windings in the air core armature. As shown, the electronic drive commutates by simultaneously energizing, supplying phase currents 104, 105, 106, in phase with the respective back emf waveforms 101, 102, 103. The current Ia 104 is on over the same electrical degrees that the back emf Ba is maximum. The phase current waveforms 104, 105, 106 show that only two phases have currents simultaneously at any time and that the currents are either stepped as on positive, on negative or not energized. Between any phase current switching between positive and negative, the phase is not energized for 60 electrical degrees. As the back emf Ba has a zero voltage crossing 108, this corresponds to the middle of the 60 degree non-energized period 109. The zero crossing 108 controls starting a 30 electrical degree delay before advancing the commutation 110.

Figure 6:
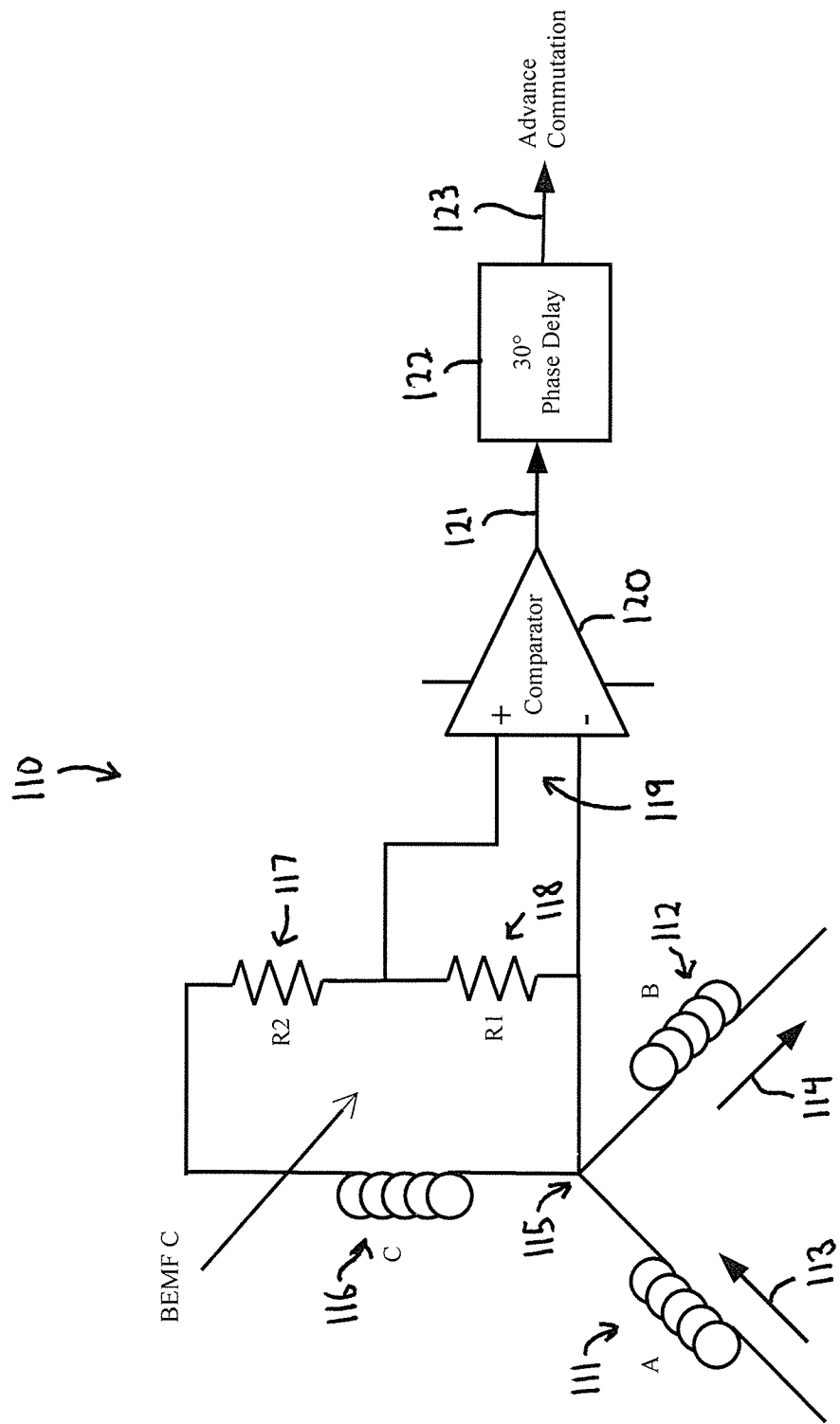
FIG. 6 is a schematic drawing of a back emf zero crossing sensing circuit and method for use in an electronically commutated motor in accordance with the invention.

A schematic drawing of a back emf zero crossing sensing circuit and method for use in an electronically commutated motor in accordance with the invention is shown in FIG. 6. The circuit 110 utilizes the three phase armature windings 111, 112, 116 to control triggering of advances in commutation. The windings 111, 112, 116 are preferably connected together in a wye configuration with center neutral 115 to prevent circulating currents that can occur in delta connections. Two phases 111, 112 are instantaneously energized with currents 113, 114 and the third leg 116 is instantaneously not energized. The instantaneously non-energized winding 116 is used to accurately determine rotor position to control triggering advances in commutation. The back emf of the non-energized winding 116 is monitored for zero crossing by use of a comparator 120. The back emf from the instantaneously non-energized phase 116 is fed into a voltage divider using resistors 117, 118 to reduce the back emf to a low voltage signal 119 that is fed into the comparator 120. When the low voltage signal 119 crosses zero voltage the output 121 of the comparator 120 flips polarity. The output 121 is fed into a timing delay 122 that applies a 30 electrical degree delay prior to output a signal 123 to advance the commutation. Advancing the commutation applies currents 113, 114 to the next required pair of the phase windings 111, 112, 116 for energization to produce torque, while a a new non-energized phase winding is used for monitoring back emf zero crossing to control triggering advances in commutation. Preferably three separate circuits 110 are utilized with one for each phase 111, 112, 116 to provide accurate commutation with the highest efficiency of the electronically commutated motor.

Figure 7:
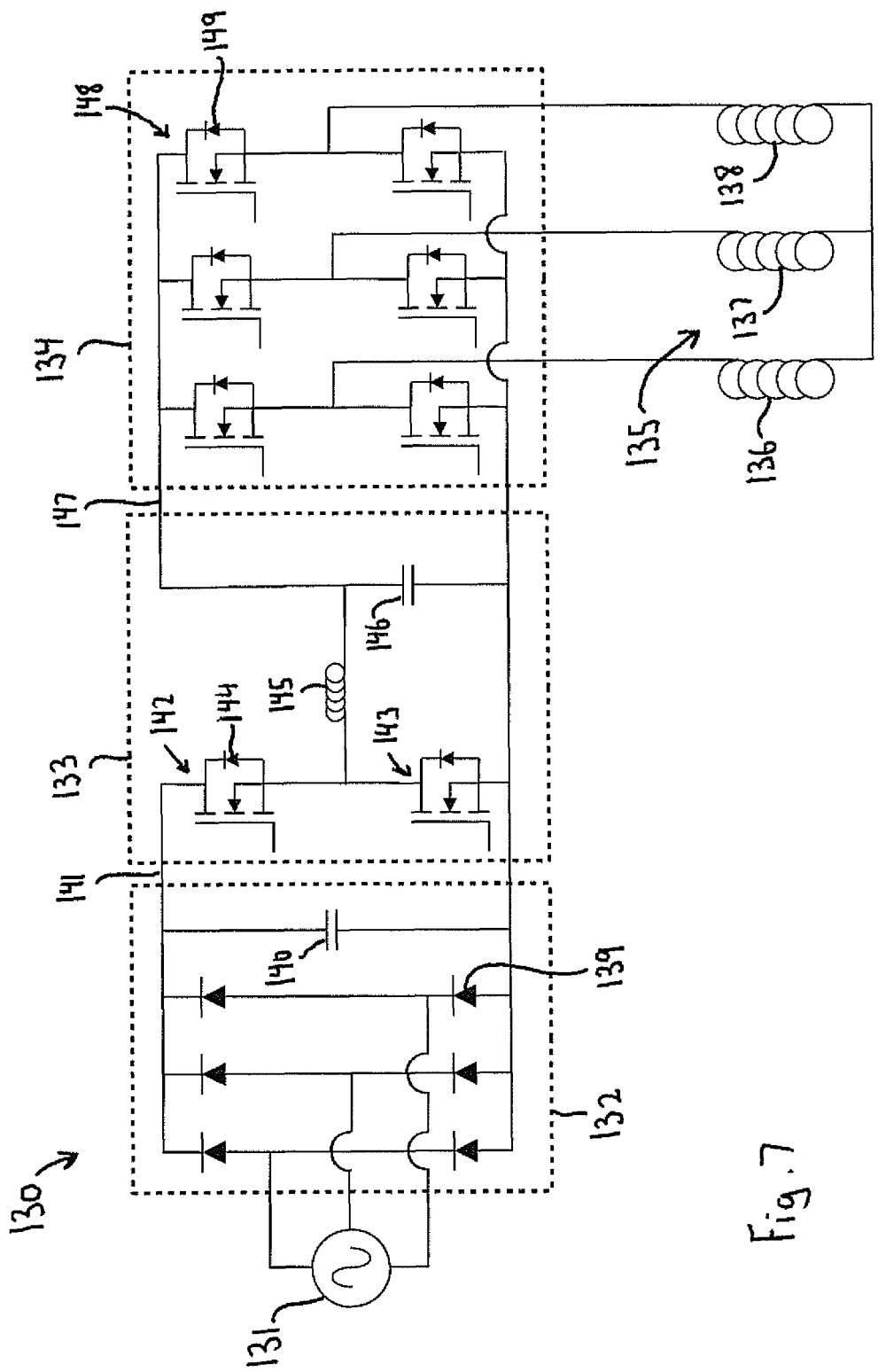
FIG. 7 is a schematic electrical circuit diagram of an electronic drive with a pulse width modulated switchmode converter controlled variable DC link for use in an electronically commutated motor in accordance with the invention.

A schematic electrical circuit diagram of an electronic drive with a pulse width modulated switchmode converter controlled variable DC link for use in an electronically commutated motor in accordance with the invention is shown in FIG. 7. The electronic drive 130 comprises a utility power connection 131, an input rectifier 132, a switchmode converter 133, and a commutation H-bridge 134 which operate together to synchronously drive armature phase windings 136, 137, 138. The electronic drive 130 takes in AC utility power 131 and rectifies it using rectifier 132. The rectifier 132 is comprised of a diode bridge 139 and a filter capacitor 140 which outputs power to a fixed DC bus 141. The fixed DC bus 141 provides power to a pulse width modulated switchmode converter 133 that varies output voltage to a variable DC link 147 using switching of the two transistors 142, 143. The switchmode converter 133 switches the top MOSFET 142 varying the duty cycle from zero to one hundred percent while the switching of the bottom MOSFET 143 varies less in response to the energy storage in the inductor 145. The inductor 145 and capacitor 146 maintain the voltage to the variable DC link 147 at a desired level, for either limiting current to the windings 136, 137, 138 and/or the rotational speed of the rotor. Freewheeling diodes 144 are coupled across the MOSFETs 142, 143 to allow conduction and prevent voltage spikes from release of stored inductive energy. The variable DC link 147 powers a commutation H-bridge 134 comprising six MOSFETs 148 in which they are turned fully on or off to control commutation. At any instant, only one upper and one lower MOSFET 148 are turned on, which causes synchronous currents 135 to flow through two of the three phase windings 136, 137, 138 at any one time, with one phase winding non-energized. Freewheeling diodes 149 are coupled across the MOSFETs 148 in the H-bridge 134 to allow conduction and to prevent voltage spikes from release of stored inductive in the phase windings 136, 137, 138. The zero voltage crossing of the back emf of the instantaneous non-energized winding is used to control triggering of advances in the commutation switching of the H-bridge 134.

Figure 8:
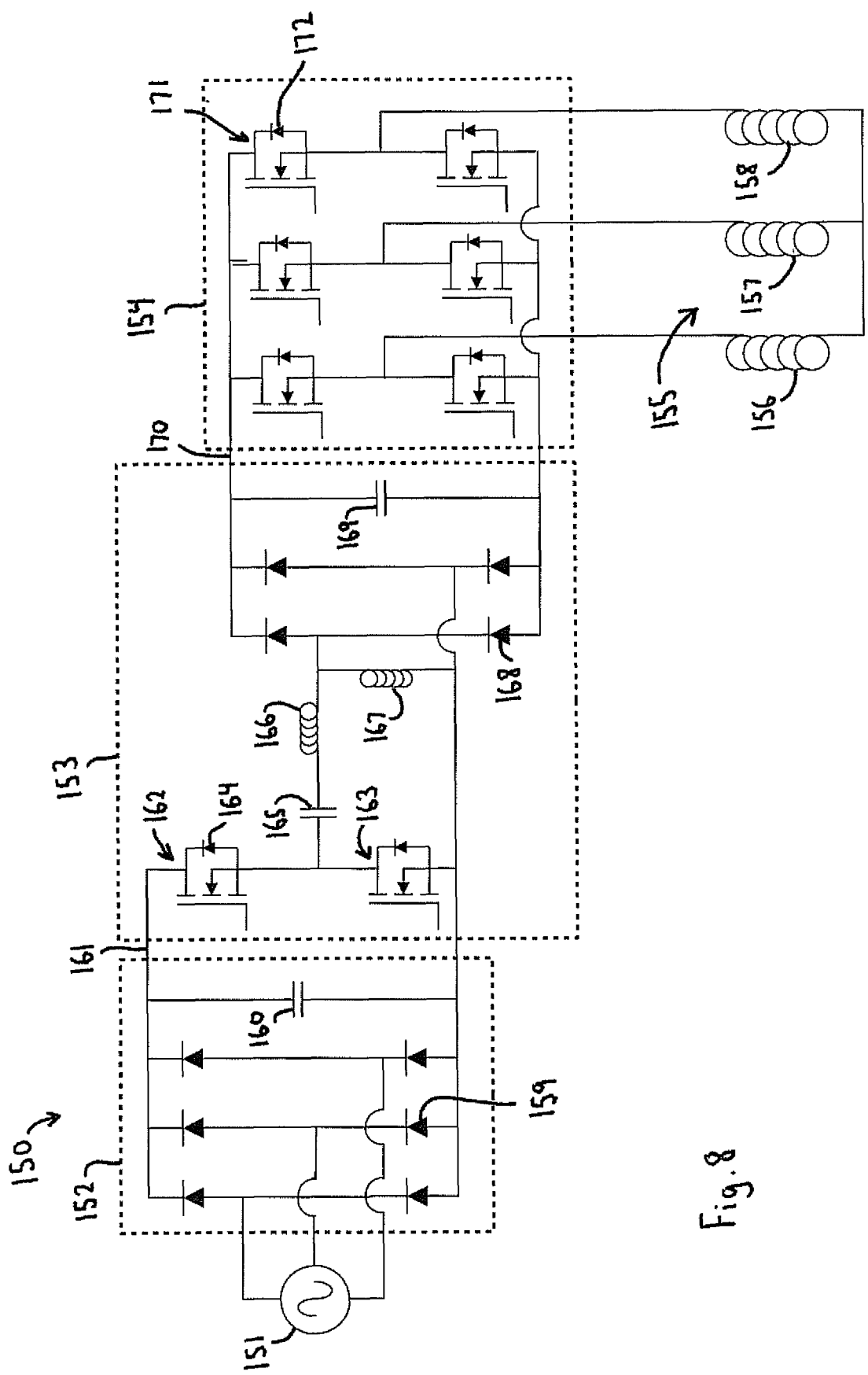
FIG. 8 is a schematic electrical circuit diagram of an electronic drive with a half bridge LLC resonant switchmode converter controlled variable DC link for use in an electronically commutated motor in accordance with the invention.

A schematic electrical circuit diagram of an electronic drive with a half bridge LLC resonant switchmode converter controlled variable DC link for use in an electronically commutated motor in accordance with the invention is shown in FIG. 8. The electronic drive 150 comprises a utility power connection 151, an input rectifier 152, a switchmode converter 153, and a commutation H-bridge 154 which operate together to synchronously drive armature phase windings 156, 157, 158. The electronic drive 150 takes in AC utility power 151 and rectifies it to DC power 161 using rectifier 152. The rectifier 152 is comprised of a diode bridge 159 and a filter capacitor 160 which outputs power to a fixed DC bus 161. The fixed DC bus 161 provides power to a half bridge LLC resonant type switchmode converter 153 that varies output voltage to a variable DC link 170. The resonant converter 153 consists of the switch network comprising MOSFETs 162, 163, the resonant tank comprising capacitor 165 and inductors 166, 167 and the rectifier comprising diodes 168 and capacitor 169. The resonant converter 153 minimizes switching losses in the MOSFETs 162, 163 and losses by switching at near zero voltage or current, which would be less than 10% full operating value and preferably as close to zero as possible. Near zero voltage switching is achieved by the resonance of the inductors 166, 167 and capacitor 165 which naturally cycles through zero and is considered soft switching. The controlled switching of the MOSFETs 162, 163 allows frequency modulation for variation of the voltage level of the variable DC link 170 after rectification by the rectifier diodes 168. Freewheeling diodes 164 are coupled across the MOSFETs 162, 163 to allow conduction and to prevent voltage spikes from release of stored inductive energy from inductors 166, 167. The output of the resonant converter 153 is a variable DC link 170 which powers a commutation H-bridge 154 comprising six MOSFETs 171 in which they are turned fully on or off to control commutation. At any instant, only one upper and one lower MOSFET 171 are turned on, which causes synchronous currents 155 to flow through two of the three phase windings 156, 157, 158 at any one time, with one phase winding non-energized. Freewheeling diodes 172 are coupled across the MOSFETs 171 in the H-bridge 154 to allow conduction and to prevent voltage spikes from release of stored inductive in the phase windings 156, 157, 158. The zero voltage crossing of the back emf of the instantaneous non-energized winding is used to control triggering of advances in the commutation switching of the H-bridge 154. Although shown with a non-isolated half bridge LLC resonant converter 153, isolation can be added, if desired, with the inclusion of a transformer between the LLC resonant tank 165, 166, 167 and input of the diode rectifier 168.

The use of a resonant converter for the switchmode converter can allow higher efficiency through lower switching losses for varying the voltage of the variable DC link. It can also allow the switchmode converter to efficiently operate at higher frequencies for smaller component sizes, lower inductance requirements and less current ripple. The conduction losses of the half bridge resonant converter previously shown can also be reduced in half by using a full bridge version resonant converter which effectively reduces currents in half. The full bridge LLC resonant converter utilizes a switching network of four transistors as opposed to only two transistors in the half bridge resonant converter. This reduces the current in half, the losses scale with the square of the current but there are twice the number of switches. The resulting yield is achievement of half the conduction losses compared to the half bridge resonant converter.

Figure 9:
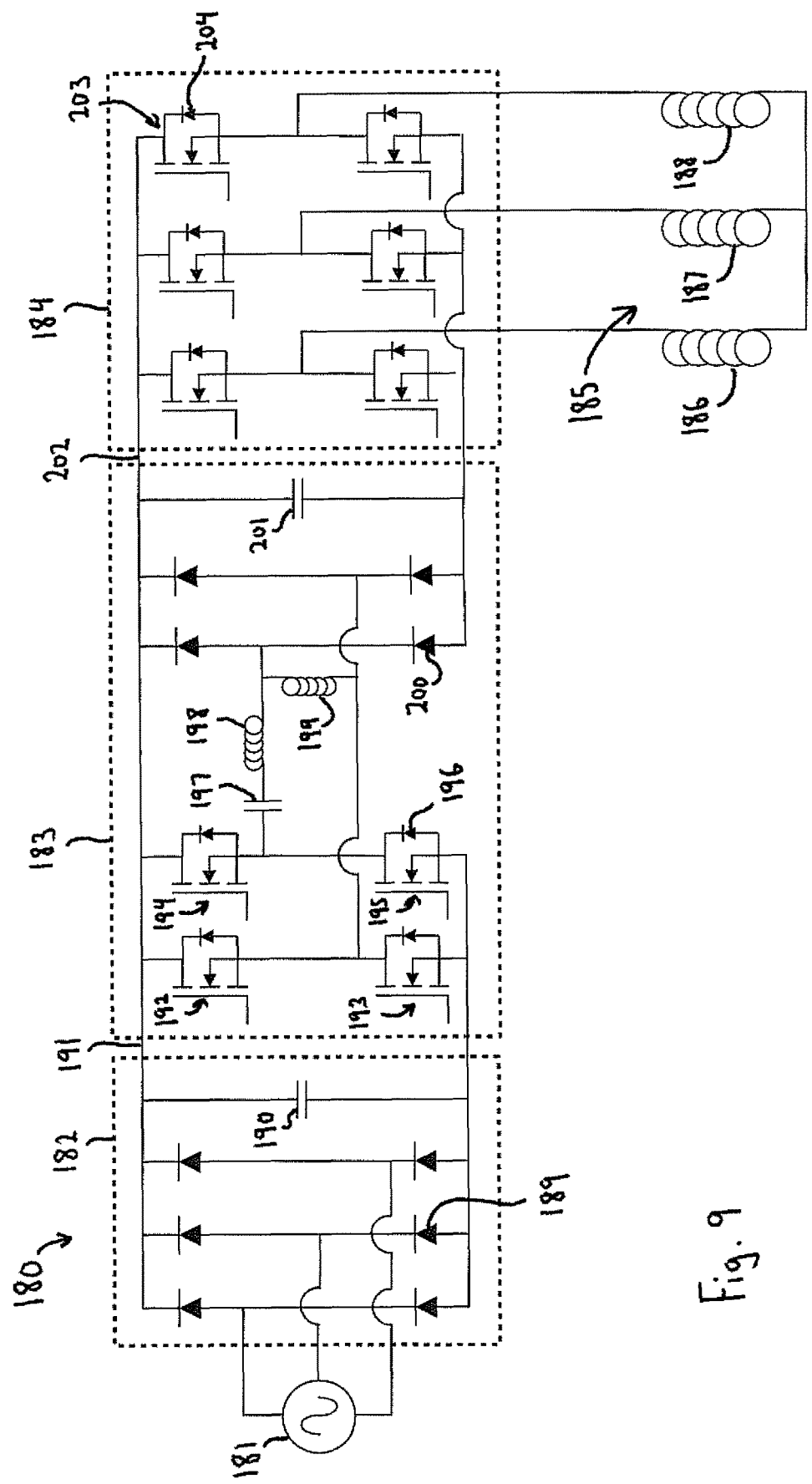
FIG. 9 is a schematic electrical circuit diagram of an electronic drive with a full bridge LLC resonant switchmode converter controlled variable DC link for use in an electronically commutated motor in accordance with the invention.

A schematic electrical circuit diagram of an electronic drive with a full bridge LLC resonant switchmode converter controlled variable DC link for use in an electronically commutated motor in accordance with the invention is shown in FIG. 9. The electronic drive 180 comprises a utility power connection 181, an input rectifier 182, a switchmode converter 183, and a commutation H-bridge 184 which operate together to synchronously drive armature phase windings 186, 187, 188. The electronic drive 180 takes in AC utility power 181 and rectifies it to DC power 191 using rectifier 182. The rectifier 182 is comprised of a diode bridge 189 and a filter capacitor 190 which outputs power to a fixed DC bus 191. The fixed DC bus 191 provides power to a full bridge LLC resonant type switchmode converter 183 that varies output voltage to a variable DC link 202. The resonant converter 183 consists of the switch network comprising MOSFETs 192, 193, 194, 195, the resonant tank comprising capacitor 197 and inductors 198, 199 and the rectifier comprising diodes 200 and capacitor 201. The resonant converter 183 minimizes switching losses in the MOSFETs 192, 193, 94, 195 by switching at near zero voltage or current, which would be less than 10% full operating value and preferably as close to zero as possible. Near zero voltage switching is achieved by the resonance of the inductors 198, 199 and capacitor 197 which naturally cycles through zero and is considered soft switching. The controlled switching of the MOSFETs 192, 193, 194, 195 allows frequency modulation for variation of the voltage level of the variable DC link 202 after rectification by the rectifier diodes 200. Freewheeling diodes 196 are coupled across the MOSFETs 192, 193, 194, 195 to allow conduction and to prevent voltage spikes from release of stored inductive energy from inductors 198, 199. The output of the resonant converter 183 is a variable DC link 202 which powers a commutation H-bridge 184 comprising six MOSFETs 203 in which they are turned fully on or off to control commutation. At any instant, only one upper and one lower MOSFET 203 are turned on, which causes synchronous currents 155 to flow through two of the three phase windings 186, 187, 188, with one phase winding non-energized. Freewheeling diodes 204 are coupled across the MOSFETs 203 in the H-bridge 184 to allow conduction and to prevent voltage spikes from release of stored inductive in the phase windings 186, 187, 188. The zero voltage crossing of the back emf of the instantaneous non-energized winding is used to control triggering of advances in the commutation switching of the H-bridge 184. Although shown with a non-isolated full bridge LLC resonant converter 183, isolation can be added, if desired, with the inclusion of a transformer between the LLC resonant tank 197, 198, 199 and input of the diode rectifier 200.

Figure 10:
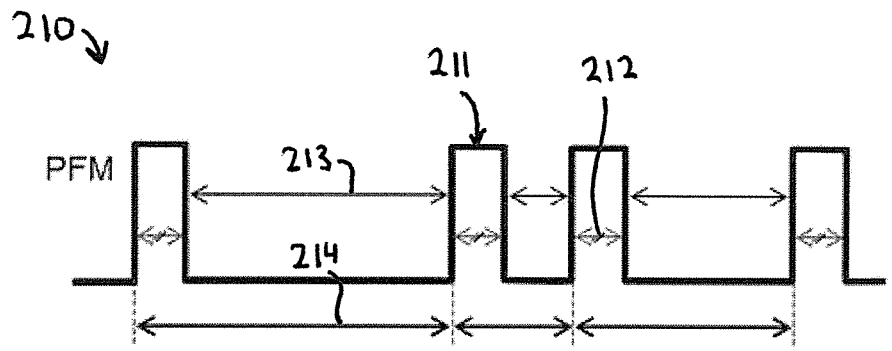
FIG. 10 is a plot of switching regulation of a resonant converter with pulse frequency modulation for use in an electronically commutated motor in accordance with the invention.

A plot of switching regulation of a resonant converter with pulse frequency modulation for use in an electronically commutated motor in accordance with the invention is shown in FIG. 10. Most common switchmode converters today currently employ pulse width modulation switching. In pulse width modulation, the frequency is constant and the output is adjusted by varying the duty cycle or width of the pulses. Pulse width modulation switches the power at full voltage and/or current leading to high transistor switching losses. Such switching losses greatly impact efficiency of the switchmode converter and particularly at light loads because the switching operations remains the same yet power converted is reduced. In contrast, resonant converters employ frequency modulation which allows switching at near zero voltage and/or current, allowing greatly reduced transistor switching losses and increased converter efficiency. The plot of frequency modulated switching regulation 210 shows that the pulses 211 have on-time 212 that is constant and the output is adjusted by varying the off-time 213. As a result, the frequency and frequency period 214 is what is varied instead of the pulse width variation used in pulse width modulation. Switching at near zero voltage and/or current greatly reduces switching losses and under light loads, the number of switching operations also decreases, maintaining the higher efficiency.

Figure 11:
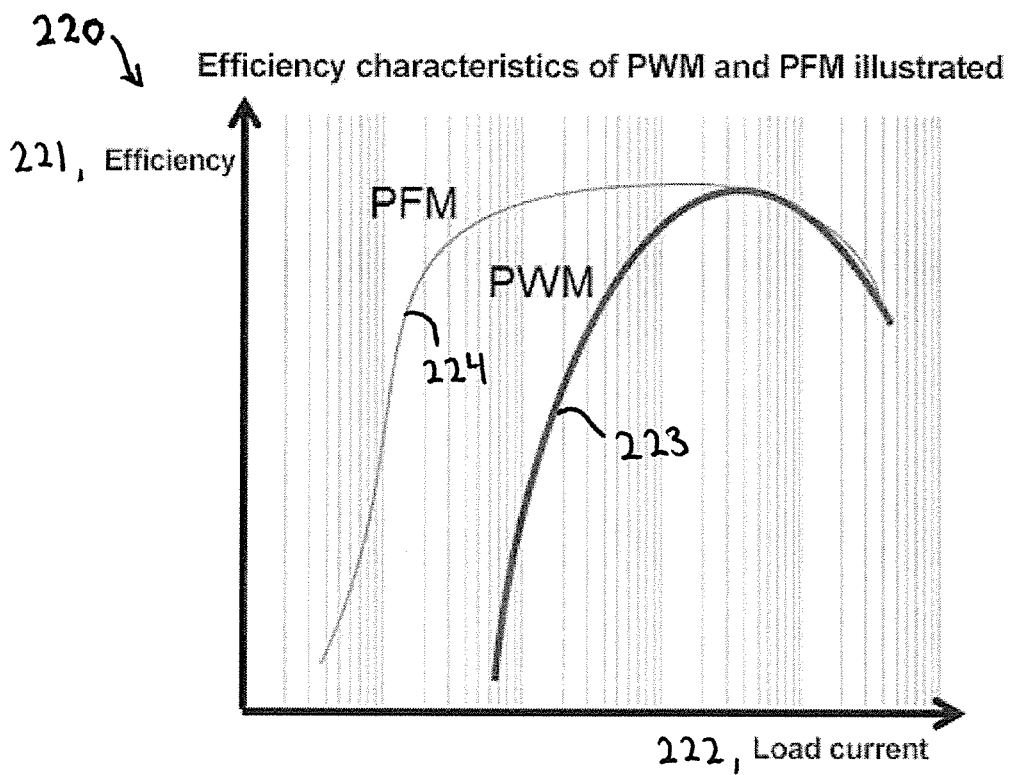
FIG. 11 is a graph of efficiency versus load current comparing switchmode power conversion by pulse width modulation and pulse frequency modulation for use in an electronically commutated motor in accordance with the invention.

A graph of efficiency versus load current comparing switchmode power conversion by pulse width modulation and pulse frequency modulation for use in an electronically commutated motor in accordance with the invention is shown in FIG. 11. The comparison 220 shows the efficiency characteristics of PWM and PFM. The variations of efficiency 221 versus the load current 222 for both pulse width modulation 223 and pulse frequency modulation 224 are shown. Because pulse width modulation 223 switches at fixed cycles even during light loads, the efficiency at lower load currents drops off and is low. Because pulse frequency modulation 224 operates with a constant on time and variable off time, the frequency is reduced under light load along with switching losses, to maintain high efficiency. Although shown here with comparable efficiencies 223, 224 at high load currents, a well designed resonant converter employing frequency modulation will typically be higher efficiency. The resonant converter efficiency is typically higher due to reduced switching losses from switching at near zero voltage and/or current. Although shown with the input rectifiers and switchmode converters distinct separate sections, it is also conceivable to potentially combine the two in integrated form and still achieve the same functioning and component sections.

Figure 12:
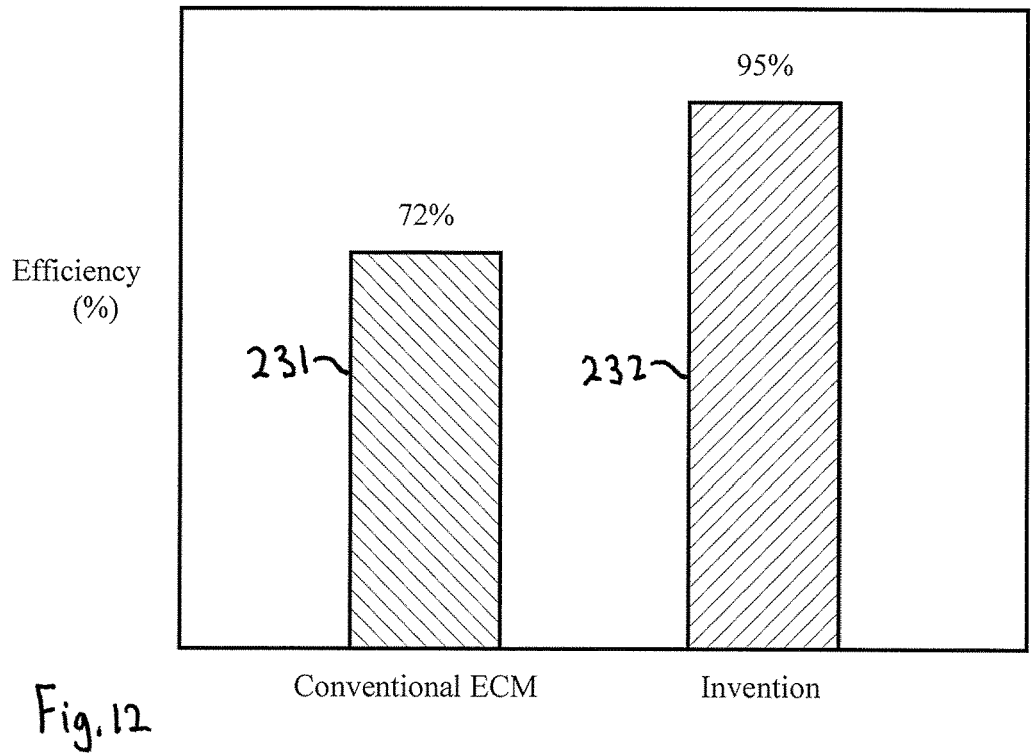
FIG. 12 is a comparison chart of efficiency between a conventional electronically commutated motor and an electronically commutated motor in accordance with the invention.

A comparison chart of efficiency between a conventional electronically commutated motor and an electronically commutated motor in accordance with the invention is shown in FIG. 12. The comparison 230 shows that a conventional one-horsepower electronically commutated motor 231 has a total efficiency from electrical supply to rotary mechanical output power of 72%. In contrast, a one-horsepower electronically commutated motor in accordance with the invention achieves a total efficiency of 95%.

Figure 13:
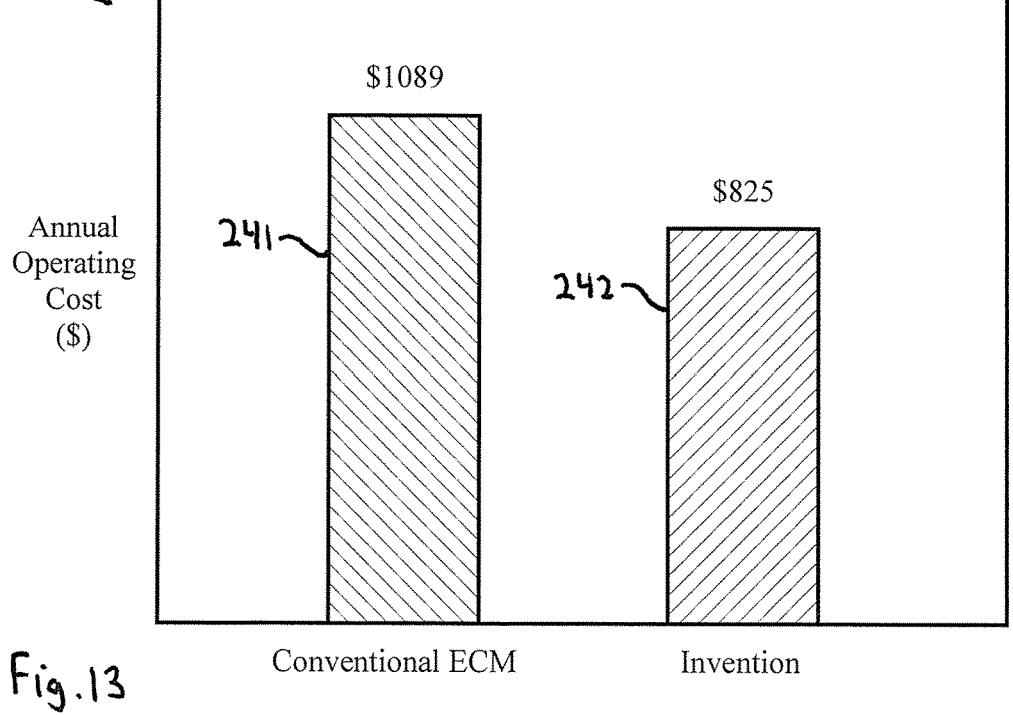
FIG. 13 is a comparison chart of annual electricity consumption costs between a conventional electronically commutated motor and an electronically commutated motor in accordance with the invention.

A comparison chart of annual electricity consumption costs between a conventional electronically commutated motor and an electronically commutated motor in accordance with the invention is shown in FIG. 13. Higher efficiency translates into substantial energy cost savings, particularly in high duty cycle applications such as for use in pumps and fans. The comparison 240 shows the annual operating electricity cost for one-horsepower motors in these applications. A one-horsepower conventional electronically commutated motor 241 accumulates roughly $1089 in annual electricity costs. In contrast, a one-horsepower electronically commutated motor in accordance with the invention accumulates roughly $825 in annual electricity costs. The annual electricity costs saving can quickly pay for the cost of the new motor.

Figure 14:
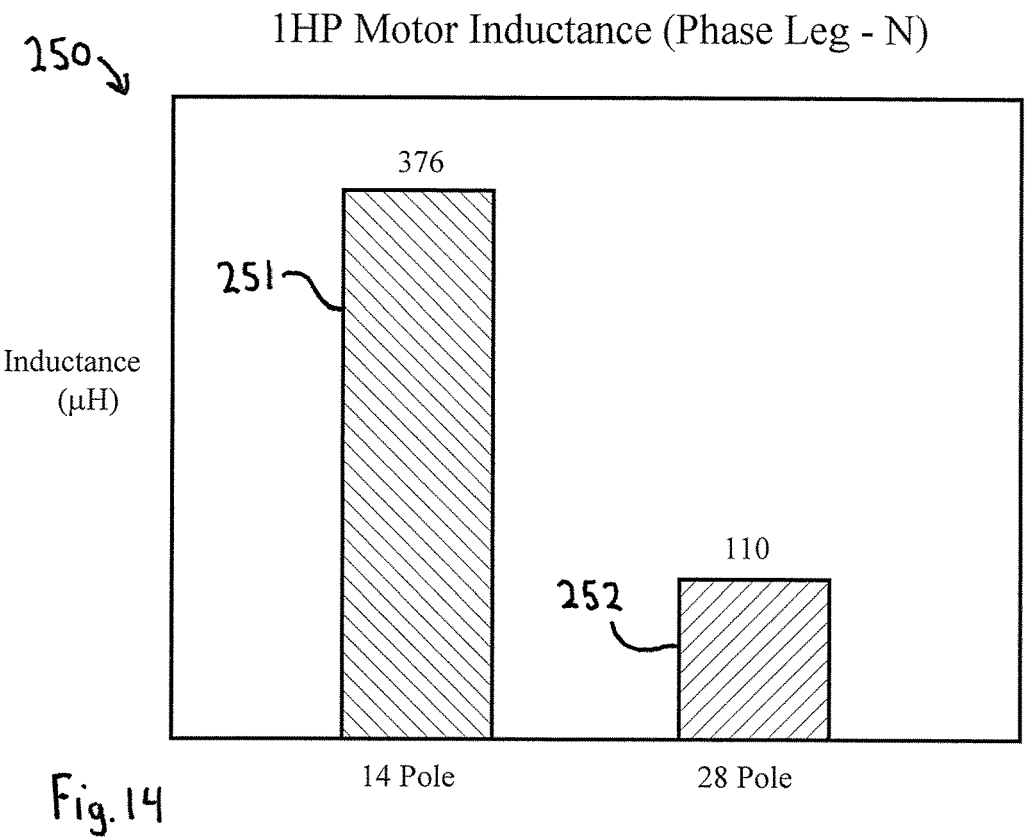
FIG. 14 is a comparison chart of phase winding inductances between 14 pole and 28 pole electronically commutated motors in accordance with the invention.

Although electronically commutated motors can be constructed with different numbers of poles, the new motors with cooperating electronic drive allow use of higher pole counts. A higher pole count reduces the phase winding inductances, which can be problematic for conventional electronically commutated motors. A comparison chart of phase winding inductances between 14 pole and 28 pole electronically commutated motors in accordance with the invention is shown in FIG. 14. The comparison 250 shows a 14-pole electronically commutated motor 251 has a phase leg to neutral inductance 376 µH. With twice the number of poles, a 28-pole electronically commutated motor 252 has a phase leg to neutral inductance of only 110 µH.

Figure 15:
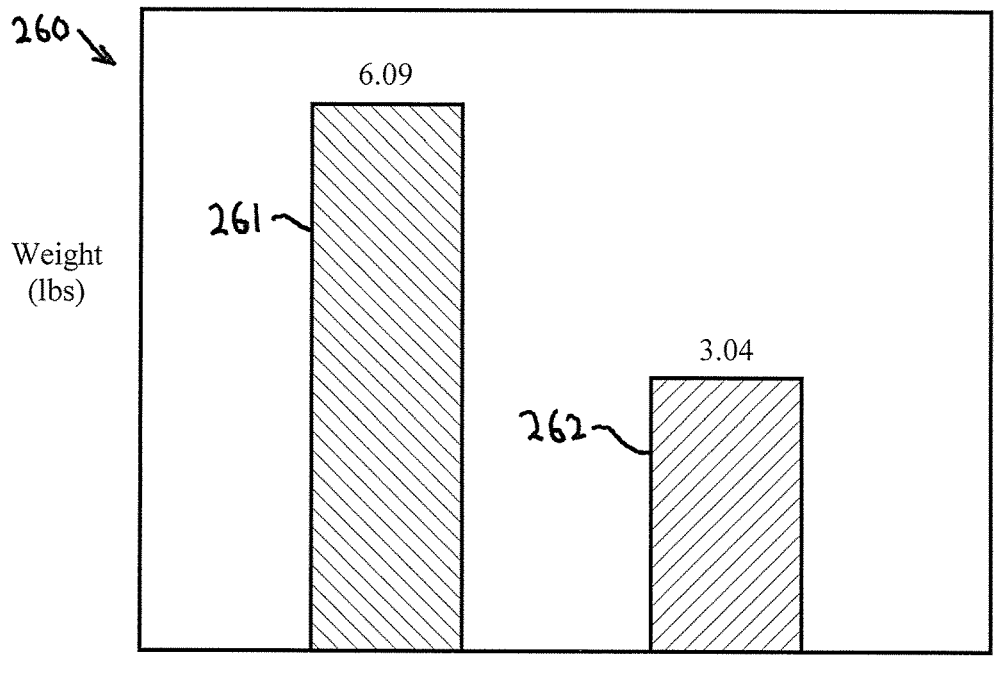
FIG. 15 is a comparison chart of rotor backiron weights between 14 pole and 28 pole electronically commutated motors in accordance with the invention.

Besides a reduction in annual electricity costs, the electronically commutated motors in accordance with the invention can operate with lower phase winding inductance from higher pole counts. Higher pole counts can allow a substantial reduction in motor weight, because thinner rotor steel backirons can be used to conduct the magnetic flux circumferentially between adjacent pole magnets. A comparison chart of rotor backiron weights between 14 pole and 28 pole electronically commutated motors in accordance with the invention is shown in FIG. 15. The comparison 260 shows that the rotor backiron weight for a one-horsepower electronically commutated motor having 14 poles is 6.09 lbs. In contrast, the same motor but using 28 poles has a rotor back iron weight of roughly half at only 3.04 lb. Lower weight reduces motor material costs as well as shipping handling and installation costs.

A block diagram of a speed control algorithm for use in an electronically commutated motor in accordance with the invention is shown in FIG. 16. In many applications such as for use in high duty cycle pumps and fans, there is not a great need to be able to rapidly respond to control changes in speed, and particularly for speed reduction. When an electronic drive is used to actively decelerate a motor rotor, the drive must absorb the excess energy. Absorbing large amounts of energy to rapidly decelerate a rotor requires the addition of a large and costly energy dump circuit to be included in the drive. In many applications rapid response to decelerate a motor rotor is unnecessary and removal of drive acceleration torque will allow the rotor to slow passively from the pump or fan drag torque. In such applications, the electronic drive size and costs can be reduced by preventing active electronic drive deceleration. The algorithm 270 comprises providing a speed control signal 271 to a drive logic control 272 that compares the control signal with the instantaneous motor speed. If the speed control signal 271 is greater 273, then the electronic drive applies acceleration torque 274. If the speed control signal 271 is less 275, then the electronic drive turns off acceleration torque 276. With the acceleration torque off 276, the electronic drive waits for the motor speed to slow 277, passively from the application load.

An operation chart illustrating the functioning of the speed control algorithm of FIG. 16 is shown in FIG. 16A. The operation 280 shows the variations of the speed control 271, and the resulting application of drive acceleration torque 274 and turning off of drive acceleration torque 276. The electronic drive applies acceleration torque 274 to the motor when the speed control signal 271 is greater than the motor speed and turns off acceleration torque 276 allowing the motor to passively decelerate 277 when the speed control signal 271 is less. By this method, no resistive energy dump circuit is required in the electronic drive since there is no application of active motor deceleration and the drive size and costs may be reduced.

Figure 17:
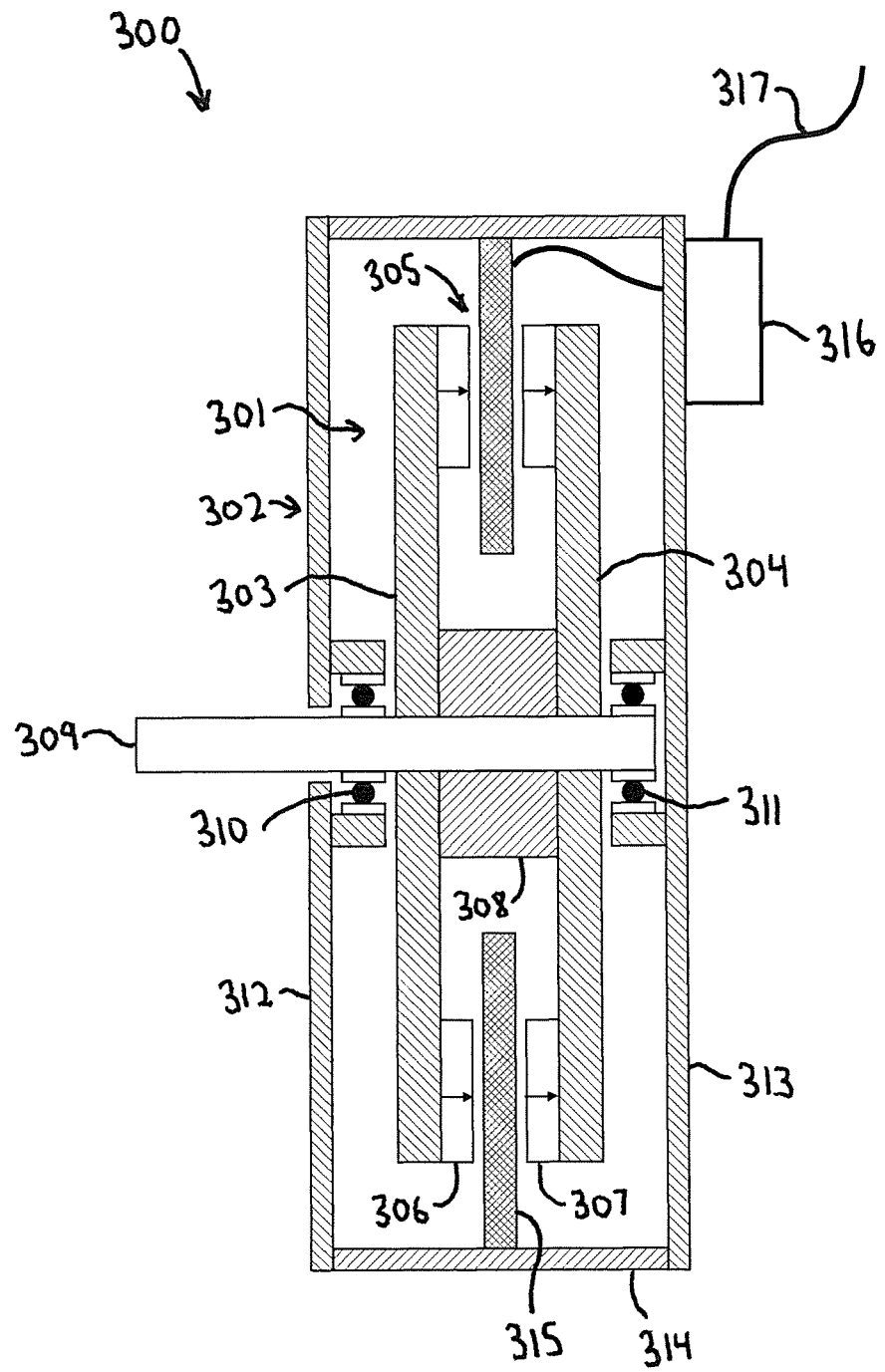
FIG. 17 is a schematic drawing of an axial gap configuration electronically commutated motor in accordance with the invention.

The electronically commutated motor of FIG. 1 shows a radial gap configuration however the motor can also utilize an axial gap configuration. A schematic drawing of a axial gap configuration electronically commutated motor in accordance with the invention is shown in FIG. 17. The motor 300 is comprised of a rotor 301, a stator 302 and an electronic drive 316. The rotor is constructed of two spaced apart co-rotating steel discs 303, 304 with circumferential arrays of alternating polarity permanent magnets 306, 307 that drive magnetic flux back and forth across an armature airgap 305. Although shown with magnets on both discs 306, 307, a circumferential array of magnets may alternatively be applied to only one disc, but with the lower resulting magnetic flux in the armature airgap 305 per amount of magnet material. The steel discs 303, 304 are attached to a hub 308 which couples to a shaft 309. The shaft 309 is journaled for rotation by bearings 310, 311. The bearings 310, 311 are supported by housing endplates 312, 313 which are connected by an outer housing tube 314. Located inside the armature airgap 305 is an air core armature 315 which is supported by outer housing tube 314 and exerts torque onto the rotor 301 when its windings are energized. The electronic drive 316 is attached to the housing endplate 313. The electronic drive 316 converts a utility or fixed frequency power connection 317 into synchronous power provided to the air core armature 315 that drives the rotor 301.

Obviously, numerous modifications and variations of the described preferred embodiment are possible and will occur to those skilled in the art in light of this disclosure of the invention. Accordingly, we intend that these modifications and variations, and the equivalents thereof, be included within the spirit and scope of the invention as defined in the following claims, wherein we claim:

The invention claimed is:
1. An electronically commutated motor for converting between electrical and rotary mechanical energy comprising:
   a rotor, a stator and an electronic drive, wherein said rotor is journalled to rotate about an axis of rotation, said stator is stationary relative to said rotor, and said electronic drive provides synchronous power to said stator and drives said rotor;
   said rotor is constructed having a circumferential array of alternating polarity permanent magnet poles that drive magnetic flux circumferentially through said rotor and across an armature air gap created adjacent said rotor;
   said stator comprises an air core armature in said armature airgap, having three phase windings that magnetically exert torque upon said rotor when said windings are electrically energized by said electronic drive;
   said phase windings are wound from wire that is formed from bundled together multiple individually insulated conductor strands, wherein said strands are electrically connected in parallel and are electrically insulated between each other along active lengths where they lie in said magnetic flux in said armature airgap;
   said electronic drive converts electrical supply power into power that is synchronous with back emf of said phase windings by regulating power through a switch mode converter to a variable bus supplying a semiconductor output inverter bridge connected to said phase windings;
   wherein said output inverter bridge provides commutation switching, and instantaneous current regulation to said phase windings is provided by said switch mode converter.

2. An electronically commutated motor as described in claim 1 wherein:
   said switch mode converter comprises a resonant converter.

3. An electronically commutated motor as described in claim 1 wherein:
   said electronic drive electrically energizes two of said three phase windings at one time, while leaving one of said three phase windings instantaneously electrically non-energized, wherein said electronic drive monitors back-emf zero crossing events of the electrically non-energized phase winding for controlling triggering of advances in commutation.

4. An electronically commutated motor as described in claim 1 wherein:
   said electronic drive varies the speed of said rotor though application of active acceleration with passive deceleration.

5. An electronically commutated motor as described in claim 1 wherein:
   said active lengths of all said phases lie in a single layer.

6. An electronically commutated motor as described in claim 2 wherein:
   said switch mode converter regulates power supplied to said phase windings through pulse frequency modulation.

7. An electronically commutated motor as described in claim 2 wherein:
   said electronic drive applies stepped commutation to said output inverter bridge.

8. An electronically commutated motor for converting between electrical and rotary mechanical energy comprising:
   a rotor, a stator and an electronic drive, wherein said rotor is journalled to rotate about an axis of rotation, said stator is stationary relative to said rotor, and said electronic drive provides synchronous power to said stator and drives said rotor;
   said rotor is constructed having a circumferential array of alternating polarity permanent magnet poles that drive magnetic flux circumferentially through said rotor and across an armature air gap created adjacent said rotor;
   said stator comprises a slotless armature in said armature airgap, having three phase windings that magnetically exert torque upon said rotor when said windings are electrically energized by said electronic drive;
   said phase windings are wound from wire that is formed from bundled together multiple individually insulated conductor strands, wherein said strands are electrically connected in parallel and are electrically insulated between each other along active lengths where they lie in said magnetic flux in said armature airgap;
   said electronic drive converts electrical supply power into regulated power synchronous with said back emf of said phase windings through a combination of resonant switching for providing current regulation to said phase windings, in conjunction with commutation advancement triggering to said phase windings controlled from event monitoring of back-emf zero crossing in said phase windings.

9. An electronically commutated motor as described in claim 8 wherein:
   said resonant switching is used in the power conversion prior to supplying a variable bus to an output inverter bridge that drives to said phase windings.

10. An electronically commutated motor as described in claim 8 wherein:
    said current regulation is provided through use of frequency modulation.

11. An electronically commutated motor as described in claim 8 wherein:

said electronic drive applies stepped commutation to said output inverter bridge.

12. An electronically commutated motor as described in claim 8 wherein:
said phase windings are connected in a wye configuration and each has a phase leg to neutral inductance in Henries, L, said switch mode converter limits current supplied to said phase windings by switching at a frequency in Hz, f, wherein $f \geq (4/L)$.

13. An electronically commutated motor as described in claim 8 wherein:
said electronic drive varies the speed of said rotor though application of active acceleration with passive deceleration.

14. An electronically commutated motor as described in claim 8 wherein:
said active lengths of all said phases lie in a single layer.

15. An electronically commutated motor for converting between electrical and rotary mechanical energy comprising:
a rotor, a stator and an electronic drive, wherein said rotor is journalled to rotate about an axis of rotation, said stator is stationary relative to said rotor, and said electronic drive provides synchronous power to said stator and drives said rotor;
said rotor is constructed having a circumferential array of alternating polarity permanent magnet poles that drive magnetic flux circumferentially through said rotor and across an armature air gap created adjacent said rotor;
said stator comprises an airgap armature in said armature airgap, having three phase windings that magnetically exert torque upon said rotor when said windings are electrically energized by said electronic drive;
said phase windings are wound from wire that is formed from bundled together multiple individually insulated conductor strands, wherein said strands are electrically connected in parallel and are electrically insulated between each other along lengths where they lie in said magnetic flux in said armature airgap;
wherein said electronic drive converts electrical supply power into power that is synchronous with back emf of said phase windings by regulating power through a switch mode converter to a variable bus supplying a semiconductor output inverter bridge connected to said phase windings, and said electronic drive varies the speed of said rotor though use of active acceleration with passive deceleration.

16. An electronically commutated motor as described in claim 15 wherein:
said switch mode converter comprises a resonant converter.

17. An electronically commutated motor as described in claim 15 wherein:
said switch mode converter regulates power by pulse frequency modulation.

18. An electronically commutated motor as described in claim 15 wherein:
said electronic drive applies stepped commutation to said output bridge.

19. An electronically commutated motor as described in claim 15 wherein:
said phase windings are connected in a wye configuration and each has a phase leg to neutral inductance in Henries, L, said switch mode converter limits current supplied to said phase windings by switching at a frequency in Hz, f, wherein $f \geq (4/L)$.

20. An electronically commutated motor as described in claim 15 wherein:
said electronic drive electrically energizes two of said three phase windings at one time, while leaving one of said three phase windings instantaneously electrically non-energized, wherein said electronic drive monitors back-emf zero crossing events of the electrically non-energized phase winding for controlling triggering of advances in commutation.

\* \* \* \* \*